(12) United States Patent
Park et al.

(10) Patent No.: US 10,860,033 B2
(45) Date of Patent: Dec. 8, 2020

(54) MOVABLE OBJECT AND METHOD FOR CONTROLLING THE SAME

(71) Applicant: Samsung Electronics Co., Ltd., Gyeonggi-do (KR)

(72) Inventors: Soon Yong Park, Gyeonggi-do (KR); No San Kwak, Gyeonggi-do (KR); Kyung Shik Roh, Gyeonggi-do (KR); Sung Hwan Ahn, Seoul (KR); Suk June Yoon, Seoul (KR); Min Yong Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 15/837,096

(22) Filed: Dec. 11, 2017

(65) Prior Publication Data

US 2018/0173243 A1 Jun. 21, 2018

(30) Foreign Application Priority Data

Dec. 16, 2016 (KR) .................. 10-2016-0172299

(51) Int. Cl.
*G05B 19/04* (2006.01)
*G05B 19/18* (2006.01)
(Continued)

(52) U.S. Cl.
CPC ........ *G05D 1/0274* (2013.01); *A47L 11/4011* (2013.01); *G05D 1/0221* (2013.01);
(Continued)

(58) Field of Classification Search
CPC .... G05D 1/0274; G05D 1/0221; G05D 1/038; G05D 2201/0215; A47L 11/2011; A47L 2201/04; G06N 3/04; G06N 3/008
See application file for complete search history.

(56) References Cited

U.S. PATENT DOCUMENTS

| 6,018,696 A | 1/2000 | Matsuoka et al. |
| 2008/0154457 A1* | 6/2008 | Yu .................. G05D 1/0219 701/26 |

(Continued)

FOREIGN PATENT DOCUMENTS

| JP | 2014-211862 A | 11/2014 |
| KR | 10-2011-0132659 A | 12/2011 |
| KR | 10-2014-0045848 A | 4/2014 |

OTHER PUBLICATIONS

International Search Report dated Apr. 5, 2018.
(Continued)

*Primary Examiner* — Harry Y Oh
(74) *Attorney, Agent, or Firm* — Cha & Reiter, LLC.

(57) ABSTRACT

Embodiments of the present disclosure relate to a movable object and a method for controlling the same. A method for controlling a movable object may include acquiring virtual data representing distances between each of a plurality of positions within an area and surfaces in the area, in a plurality of directions, respectively, based on a map of the area. An algorithm, such as a machine learning algorithm, may be executed that outputs positions corresponding to the virtual data. Actual distance data between the movable object and a plurality of surfaces in the vicinity of the movable object may be acquired. An actual position of the movable object may then be estimated corresponding to the actual distance data by executing the algorithm using the actual distance data. The movable object may be controlled based on the estimated actual position.

20 Claims, 26 Drawing Sheets

(51) Int. Cl.
  *G05D 1/02*  (2020.01)
  *G06N 3/04*  (2006.01)
  *A47L 11/40*  (2006.01)
  *G06N 3/00*  (2006.01)

(52) U.S. Cl.
  CPC ............ *G05D 1/0238* (2013.01); *G06N 3/04*
    (2013.01); *A47L 2201/04* (2013.01); *G05D*
    *2201/0215* (2013.01); *G06N 3/008* (2013.01)

(56) References Cited

U.S. PATENT DOCUMENTS

| | | | |
|---|---|---|---|
| 2009/0292394 A1 | 11/2009 | Hyung et al. | |
| 2009/0326713 A1* | 12/2009 | Moriya .................. | A63H 17/00 |
| | | | 700/255 |
| 2010/0214936 A1* | 8/2010 | Ito ....................... | G06K 9/00986 |
| | | | 370/252 |
| 2015/0012209 A1* | 1/2015 | Park ....................... | G01C 21/20 |
| | | | 701/408 |

OTHER PUBLICATIONS

European Search Report dated Oct. 15, 2019.
European Search Report dated Mar. 16, 2020.
European Search Report dated Oct. 20, 2020.

* cited by examiner

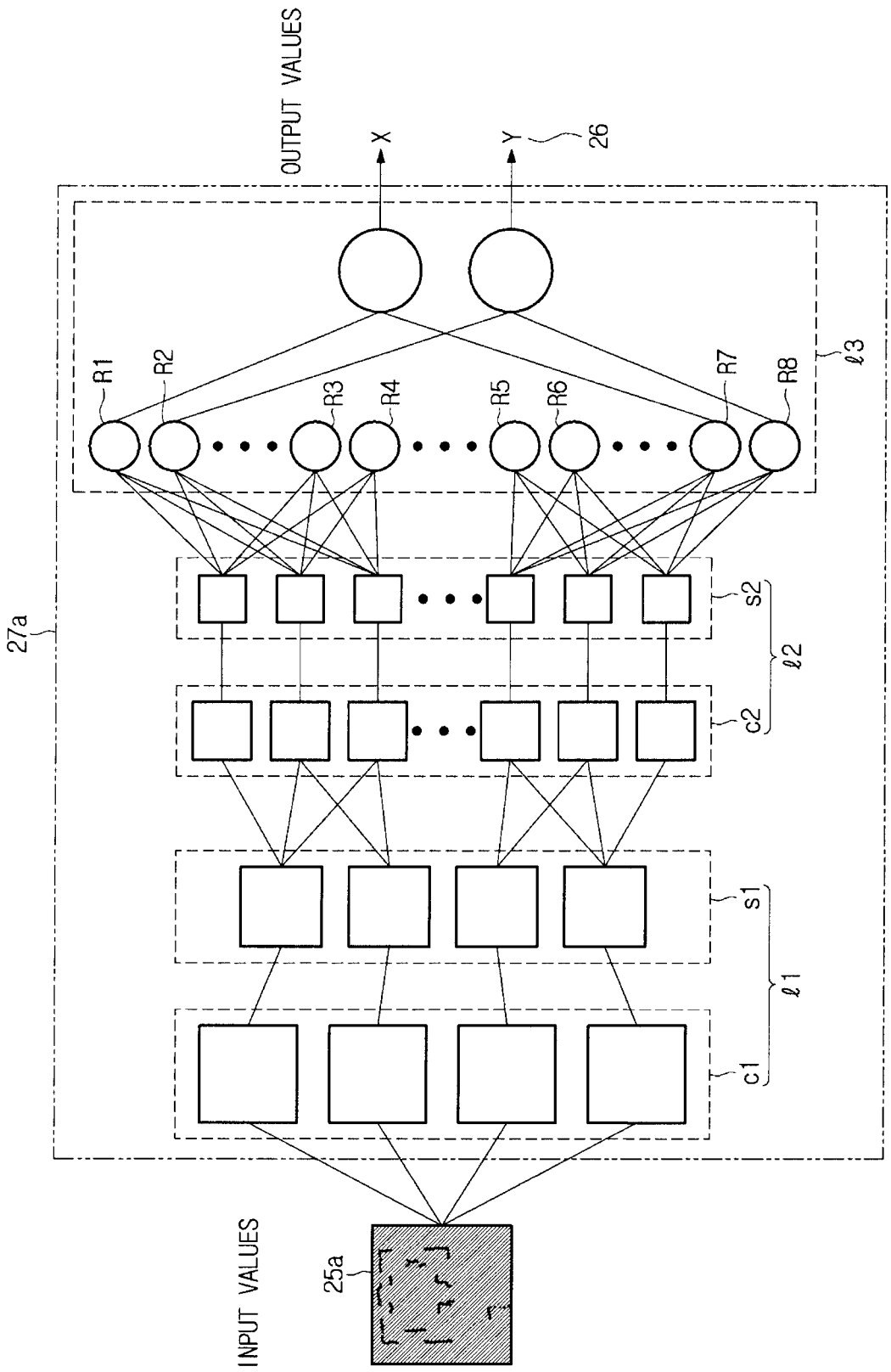

MOVABLE OBJECT AND METHOD FOR CONTROLLING THE SAME

CLAIM OF PRIORITY

This application claims the benefit under 35 U.S.C. 119(a) of Korean Patent Application No. 10-2016-0172299, filed on Dec. 16, 2016 in the Korean Intellectual Property Office, the disclosure of which is incorporated herein by reference in its entirety.

BACKGROUND

1. Field

Embodiments of the present disclosure relate to a movable object and a method for controlling the same.

2. Description of Related Art

A movable object may be defined as an apparatus that can move from a one location to another. The movable object may move between first and second locations by using at least one moving means, e.g., a wheel, a rail, or a mechanical foot for walking, provided in the movable object. The movable object may collect external information by using a sensor and then move according to the collected information. Alternatively, the movable object may travel according to a user's command, which is input through an additional operating means.

A movable object may be any of a variety of apparatuses capable of moving. Some examples of a movable object include vehicles, carts, a variety of construction equipment, robot cleaners and toy cars. Other examples include wheeled medical equipment, and robots used in the household, industrial, medical or military purposes, e.g., an automated guided vehicle (AGV).

SUMMARY

An aspect of the present disclosure to provide a movable object capable of quickly and accurately estimating and determining a current position, and a method for controlling the same.

In an aspect, a method for controlling a movable object may involve acquiring virtual data representing distances between each of a plurality of positions within an area and surfaces in the area, in a plurality of directions, respectively, based on a map of the area. An algorithm may be executed that outputs positions corresponding to the virtual data. Actual distance data between the movable object and a plurality of surfaces in the vicinity of the movable object may be acquired. An actual position of the movable object may then be estimated corresponding to the actual distance data by executing the algorithm using the actual distance data. The movable object may be controlled based on the estimated actual position.

The acquisition of the virtual data for at least one position of the positions may involve performing a ray casting in a horizontal plane about 360 degrees of the at least one position on the map.

The algorithm may be a machine learning algorithm that learns positions corresponding to the virtual data applied as input data. The algorithm may comprise at least one of deep neural network (DNN), convolution neural network (CNN), recurrent neural network (RNN), deep belief neural network (DBN), and deep Q-networks.

The execution of the algorithm may include converting the virtual data into processable data and performing a machine learning in which the processable data is input and at least one position corresponding thereto is output.

In another aspect, a movable object may comprise a storage storing a map of an area; a data collector acquiring actual distance data between the movable object and a plurality of surfaces in the vicinity thereof, in a plurality of directions, respectively; a processor executing instructions for: acquiring the actual distance data from the data collector; acquiring virtual distance data representing distances between each of a plurality of positions within an area and surfaces in the area, in a plurality of directions, respectively, based on the map; executing an algorithm that outputs positions corresponding to the virtual data; and estimating an actual position of the movable object corresponding to the actual distance data by executing the algorithm using the actual distance data.

BRIEF DESCRIPTION OF THE DRAWINGS

These and/or other aspects of the disclosure will become apparent and more readily appreciated from the following description of embodiments, taken in conjunction with the accompanying drawings of which:

FIG. 5 is a diagram illustrating an example of a neural network.

DETAILED DESCRIPTION

Hereinafter, embodiments of a movable object will be described with reference to FIGS. 1 to 12.

Figure 1:
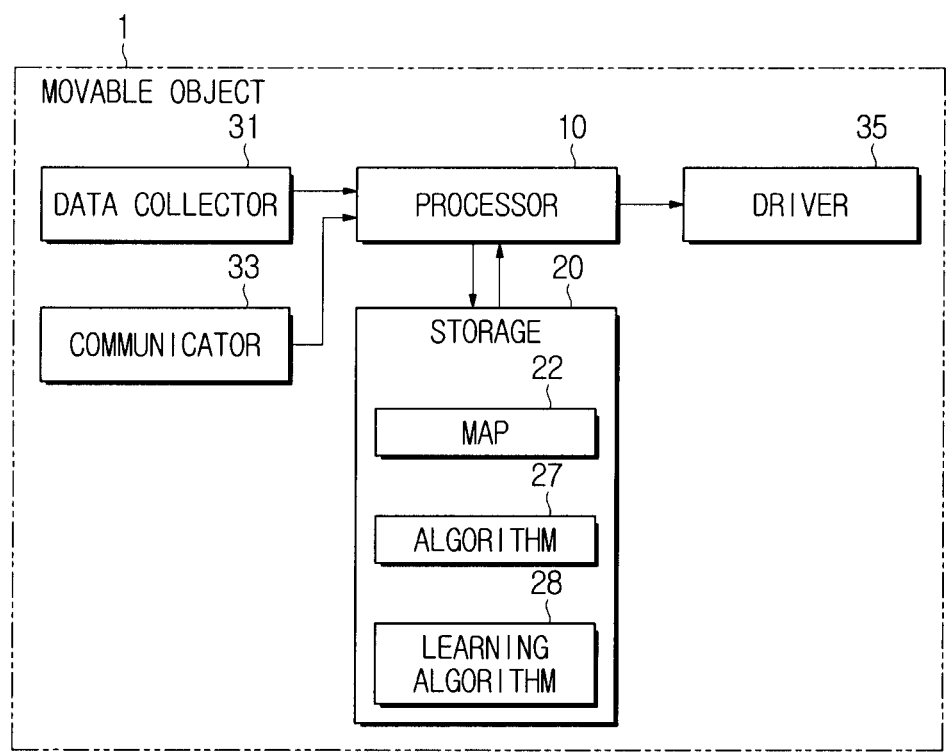
FIG. 1 is a block diagram illustrating a movable object according to an embodiment of the present disclosure.

FIG. 1 is a block diagram illustrating a movable object, 1, according to an embodiment of the present disclosure. Movable object 1 may include a processor 10, a storage 20, a data collector 31, a communicator 33 and a driver 35. Movable object 1 may be an object capable of moving from a certain location to another location according to a user's control or a predetermined setting. Movable object 1 may be a vehicle, a cart, a robot, construction equipment, etc., among other non-limiting examples of movable objects discussed above.

The processor 10, the storage 20, the data collector 31, and the driver 35 are electrically connected to one another and configured to transmit and/or receive data with each other. Such data communication may be over a data bus or a circuit embedded in the movable object 1. Alternatively, the processor 10, the storage 20, the data collector 31, and the driver 35 may transmit and/or receive data by using a wireless communication network, e.g., WIFI, WIFI Direct, Near Field Communication (NFC) or CAN communication.

The processor 10 is configured to control the overall operation of the movable object 1. For example, the processor 10 may receive data collected by the data collector 31 and perform a variety of determinations related to the operation of the movable object 1 based on the received data. The processor 10 may generate a control signal corresponding to the determined operation and transmit the generated control signal to the driver 35. Accordingly, the processor 10 may control the movable object 1 to move, rotate, or stop according to the determination.

According to an embodiment, the processor 10 may determine an "actual position" of the movable object 1. The actual position of the movable object 1 may be an absolute or relative position in which the movable object 1 is located at a point of time in which the processor 10 determines a position of the movable object 1. The position in which the movable object 1 is located may be defined in a variety of methods, and may be defined as a location of a reference point of movable object 1, e.g., a center point, a front end, a rear end or an arbitrary point of movable object 1. According to the performance of the processor 10 or the location determination method, there may be a difference between the position of the movable object 1 determined by the processor 10, and a position in which the movable object 1 is actually located.

Storage 20 stores a machine learning algorithm 28 (hereafter, just "learning algorithm" 28) which is an artificial intelligence type computer program executed by processor 10. According to an embodiment, the processor 10 may determine a current position of the movable object 1 by using actual data provided by the data collector 31 and executing the learning algorithm 28. Here, "actual data" refers to data that is directly acquired from items (objects and surfaces) present in the environment outside of the movable object 1. Each instance of the actual data (interchangeably referred to herein as "actual distance data") may represent a distance between the reference point of movable object 1 and a surface in the environment in a line of sight in a particular direction.

For example, the processor 10 may apply the actual data to the learning algorithm 28 and acquire position information corresponding to the actual data, e.g., the coordinates based on a Cartesian coordinate system, using the learning algorithm 28, thereby determining the actual position of the movable object 1. In this case, the position information corresponding to the actual data may be determined as the actual position of the movable object 1.

According to an embodiment, the processor 10 may directly acquire the learning algorithm 28 and determine the actual position of the movable object 1 by using the directly acquired learning algorithm 28.

Particularly, the processor 10 may call a map 22 stored in the storage 20, and acquire at least one instance of "virtual data" from at least one point of the called map 22. "Virtual data" refers to data that is acquired by calculation using the map 22, without measuring the data from the environment outside movable object 1. More specifically, virtual data for a particular position within an area defined by the map may represent distances, in different respective directions, between that position and surfaces in the area. In one example, processor 10 acquires the virtual data by using a ray casting over 360 degrees in a horizontal plane, on at least one point in the map.

When the virtual data is acquired, the processor 10 may perform machine learning by inputting the acquired virtual data to a certain algorithm 27. Algorithm 27, like learning algorithm 28, is computer program code executed by processor 10. According to the result of the machine learning, the processor 10 may acquire/train the learning algorithm 28. Herein, the learning algorithm 28 is said to be "acquired" or "trained" when the learning of the positions corresponding to the input virtual data is completed, such that no further learning is necessary. The learning algorithm 28 may be temporarily or persistently stored in the storage 20.

More specifically, the machine learning performed by the learning algorithm 28 is a learning that enables the learning algorithm 28 to determine a position corresponding to virtual data when the virtual data is applied as input data. Once trained, the algorithm 28 is able to output an estimated position that matches specific input data. In this manner, when the actual position of the moving object 1 is unknown and actual data is later applied to the learning algorithm 28 as the input data, the algorithm 28 may output an estimated actual position corresponding to the actual data. That is, the learning algorithm 28 may determine that the actual data closely matches virtual data that it previously correlated with a particular position. Learning algorithm 28 can thereby estimate the actual position corresponding to the actual data through prior knowledge of that position previously corresponding to the virtual data closely matching the actual data. As a result, an estimated position of the mobile object 1 may be quickly obtained.

According to another embodiment, the processor 10 may determine the actual position of the movable object 1 by executing the learning algorithm 28 transmitted from an external server or a terminal device (not shown) via a communicator 33.

When the actual position of the movable object 1 is determined, the processor 10 may determine a sequential operation of the movable object 1 based on the determined actual position. For example, the processor 10 may generate a control signal to allow the movable object 1 to move in a predetermined direction or towards a target point, based on the actual position, and the processor 10 may transmit the control signal to the driver 35.

The processor 10 may be implemented by using Central Processing Unit (CPU), Micro Controller Unit (MCU), or Graphic Processing Unit (GPU). A detailed operation of the processor 10 will be described later.

The storage 20 may temporarily or persistently store at least one of the various programs and data required for the operation of the processor 10. The storage 20 may include a main storage and auxiliary storage. Storage 20 may be implemented by a semiconductor storage medium, e.g., random access memory (RAM), read-only memory (ROM), or flash memory, a magnetic disk storage medium, e.g., a hard disk, a magnetic drum storage medium or an optical recording medium.

As illustrated in FIG. 1, the storage 20 may store the learning algorithm 28. Learning algorithm 28 may be comprised of computer code constructed by machine learning, where the machine learning may employ at least one of a deep neural network, convolution neural network, recurrent neural network, deep belief neural network, and a deep Q-neural network.

According to embodiments, the storage 20 may further store at least one of the map 22 and the algorithm 27. Map 22 represents information related to a certain area arranged in a predetermined format. The area may be or include an inner space of a building. Some examples of buildings include various facilities or structures, e.g., detached houses, apartment houses, commercial buildings, factories, hospitals, schools, or warehouses. In addition, the area may include roads, underground walkways or pedestrian overpasses. The area may be defined differently according to the type of the movable object 1. For example, when the movable object 1 is a robot cleaner, the area may include the inner space of the detached house and the apartment houses. As another example, when the movable object 1 is an automatic guided vehicle, the area may include the inner space of the factories. According to embodiments, the map 22 may be a two-dimensional map or a three-dimensional map and may be stored in any suitable format understandable by processor 10 (e.g. while executing learning algorithm 28) to identify the boundaries of the structures thereof.

Figure 2:
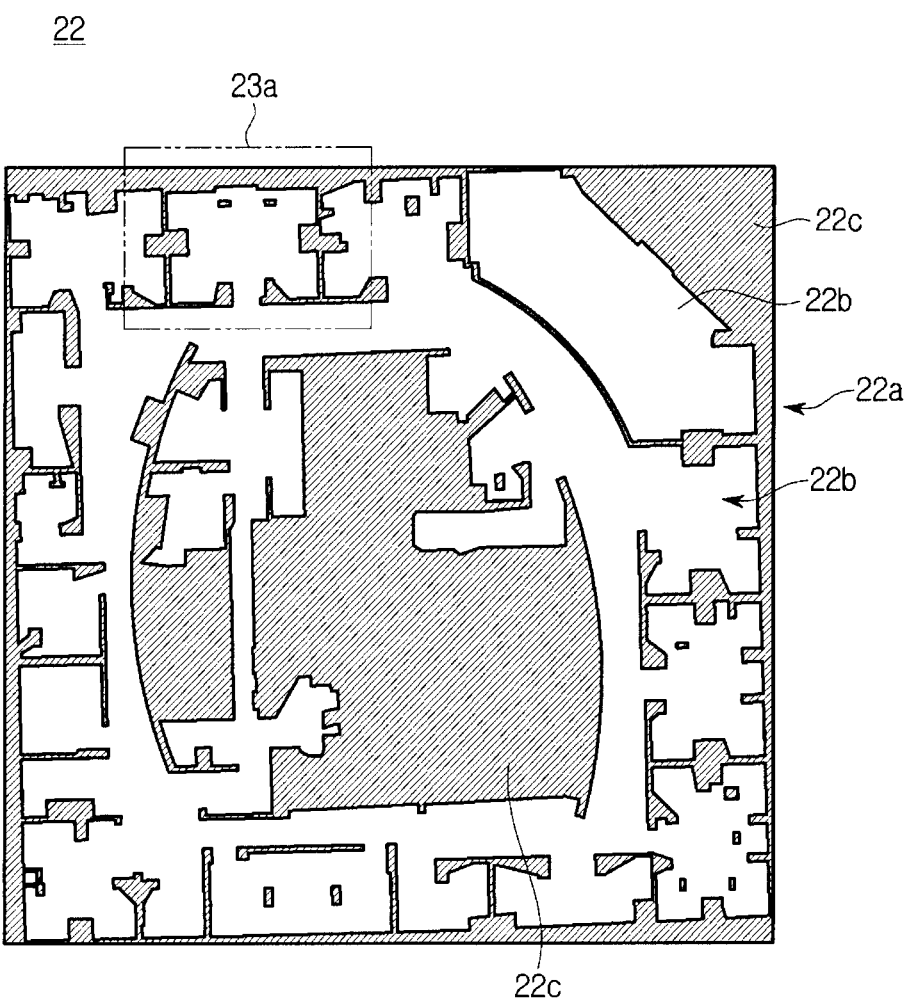
FIG. 2 is a view illustrating an example of a map.

FIG. 2 is a view illustrating an example of map 22, which has a map area 22a. The white areas of map 22 may represent positions 22b to which the movable object 1 is allowed to move, and the shaded areas represent positions 22c to which the movable object 1 is not allowed to move. Positions 22b may include an inner space of a room and a corridor. Positions 22c may include a variety of structures forming the buildings, e.g., a column or a wall. Positions 22c may further include points in which a certain structure or equipment, e.g., a machine or furniture, is installed. An example unit area 23a is further described below in connection with FIG. 3.

The map 22 may be transmitted to the processor 10 in response to a call command, and provide information related to a space in which the movable object 1 is present. According to an embodiment, the processor 10 may acquire virtual data based on the received map 22.

Figure 3:
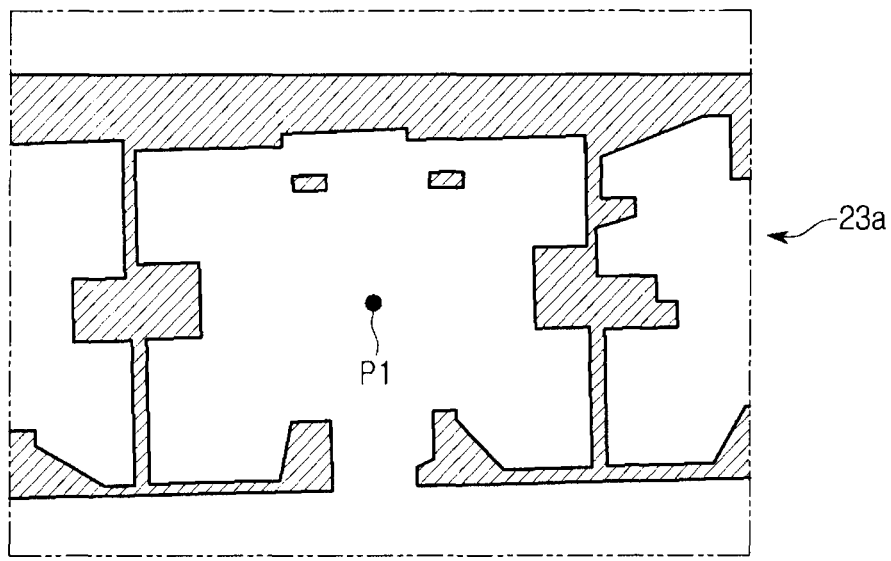
FIG. 3 is a view illustrating a portion of the map.

Referring to FIGS. 2 and 3, the map 22 may include a sub-map 23 covering a plurality of unit areas 23a (only one of which is shown in FIG. 3). Unit area 23a represents a region defined by dividing the entire area 22a of the map 22 according to a predetermined standard. The unit area 23a may be variously defined according to the operation of the user, a designer, or the processor 10. The unit area 23a may be defined in various ways according to an object illustrated by the map 22, e.g., the type of building. For example, when acquiring virtual data by using the map 22 about a detached house, each room, living room, kitchen or bathroom of the detached house may be defined as one of the unit areas 23a.

The algorithm 27 may be used to generate the learning algorithm 28. According to an embodiment, the algorithm 27 may include machine learning algorithms. The algorithm 27 may be stored in the storage 20 in the form of a non-transitory computer-readable program.

The learning algorithm 28 may be generated via execution of the algorithm 27 through the use of machine learning by using the virtual data. The learning algorithm 28 may be generated by the processor 10, or by a separate server external of the movable object 1. For example, the processor 10 or the server may generate and train the learning algorithm 28 by applying the virtual data to the stored algorithm 27 at least once. Once generated, learning algorithm 28 may be stored in the storage 20.

The algorithm 27 or the learning algorithm 28 may be implemented by using at least one of deep neural network (DNN), convolution neural network (CNN), recurrent neural network (RNN), deep belief neural network (DBN), and deep Q-networks.

The above-described map 22 and/or the algorithm 27 may be stored in a storage provided in the external server of the movable object 1, without being stored in the storage 20 of the movable object 1. According to an embodiment, the external server may generate the learning algorithm 28 by using the map 22 and the algorithm 27. The processor 10 may transmit a request for providing the learning algorithm 28 to the external server via the communicator 33, and receive the learning algorithm 28 via the communicator 33.

The data collector 31 may be configured to collect data related to the environment of the movable object 1. Such data may include data related to items (objects and surfaces) present in the vicinity of the movable object 1.

The data collector 31 may detect items actually present outside of the movable object 1, so that the movable object 1 acquires the actual data. The data collector 31 may output an electrical signal corresponding to the detection result. The output electrical signal may be transmitted to the processor 10, which generates corresponding data to be stored in storage 20.

The data collector 31 may collect the data related to the environment of the movable object 1 by using electromagnetic waves, light waves, sound waves and/or ultrasonic waves. Examples of such electromagnetic and light waves include visible light, infrared rays, ultraviolet rays, radio waves, X-rays, gamma rays, microwaves, or extremely low frequency (ELF) electromagnetic. Data collector 31 may be implemented by using a predetermined sensor, e.g., a conventional camera, an infrared camera, an obstacle detection sensor or a distance sensor, but is not limited thereto. Therefore, the data collector 31 may be implemented by using a data collection device of various types or structures.

According to an embodiment, the data collector 31 may be a two-dimensional sensor or a three-dimensional sensor. When the data collector 31 is a two-dimensional sensor, the data collector 31 may acquire data related to all or some of items present in the same plane. When the data collector 31 is a three-dimensional sensor, the data collector 31 may acquire data related to all or some of items present in a space within a certain range, and may provide depth information for the respective items.

The driver 35 is driven according to the control of the processor 10 to allow the movable object 1 to perform an operation corresponding to the control of the processor 10. For example, the driver 35 may be implemented by using a motor or an actuator. The driver 35 may be connected to at least one wheel to rotate the at least one wheel according to the control of the processor 10. Therefore, the driver 35 may allow the movable object 1 to move from a certain position to another position or the driver 35 may allow the movable object 1 to pivot at a certain point.

The communicator 33 (which is optional and may therefore be omitted in some embodiments) is configured to perform the communication with an external communication means, e.g., a communication module provided in the server. As needed, communicator 33 may transmit at least one of the actual data acquired by the data collector 31, the virtual data acquired by the processor 10, the map 22, the algorithm 27 and the learning algorithm 28, to the server. The server may transmit a variety of data, which is transmitted from the movable object 1, to a second movable object (not shown) to allow the second movable object to be operated through use of the actual data, the virtual data and/or the learning algorithm 28 that were transmitted by communicator 33.

In some cases, communicator 33 may receive at least one of the map 22, the algorithm 27 and the learning algorithm 28 from the server. In this case, the learning algorithm 28 may be a learning algorithm acquired by another movable object or the server.

Hereinafter, an example operation in which the movable object 1 determines its position will be described in detail. The example is based on an embodiment in which the processor 10 acquires the learning algorithm 28, determines the position of the movable object 1 based on the learning algorithm 28, and controls the driver 35 according to the determined position. However, as mentioned above, in other embodiments the learning algorithm 28 may be acquired by a separate server or a second movable object.

Figure 4A:
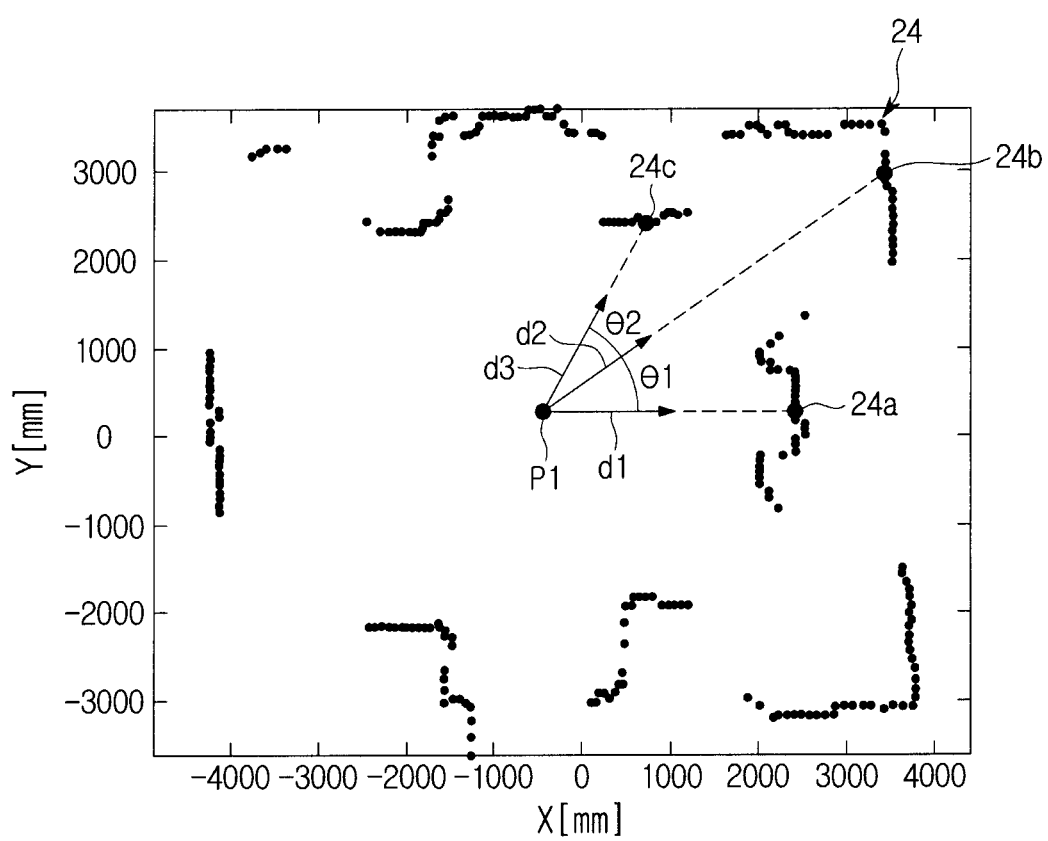
FIG. 4A is a view illustrating an example of the virtual data.

FIG. 4A is a view illustrating an example of virtual data. Processor 10 may read out map data of the complete area 22a of map 22, or of just a part (sub-map) 23 of map 22 stored in the storage 20 and acquire or compute virtual data related to the read-out map data, as illustrated in FIG. 4A. The virtual data for a given position may be line of sight distances between the given position and respective surfaces (interchangeably, "targets") defined by map 22 or 23, in different directions, respectively.

The virtual data may be defined and illustrated by coordinates based on the Cartesian coordinate system, a spherical coordinate system or a polar coordinate system. In either case, the virtual data may be given to a virtual relative distance between a position of the target present in the map 22 and 23 and a position in which the movable object 1 is present.

According to an embodiment, the processor 10 may acquire the virtual data related to all areas 22a of the map 22, or may acquire the virtual data related to some area 23 of the map 22. Acquiring the virtual data related to all areas of the map 22 may be done substantially simultaneously. Alternatively, the virtual data may be acquired in a sequence.

When the processor 10 acquires the virtual data related to all areas of the map 22, the processor 10 may sequentially acquire virtual data related to the map 23 about all of the unit areas 23a, from the map 23. The processor 10 may then combine the virtual data related to the acquired map 23, to obtain all the desired virtual data.

As illustrated in FIGS. 3 and 4, when the processor 10 acquires the virtual data related to the map 23 on the map 22, the processor 10 may call the map 23 about at least one unit area 23a from the storage 20 and set a reference position (P1) on the called map 23 in a random manner or according to a predetermined setting by the user or the designer. Accordingly, the processor 10 may acquire the virtual data 24 based on the setting reference position (P1).

According to an embodiment, the processor 10 may acquire the virtual data 24 by using ray casting. Ray casting is a method for virtually detecting a target, which is the shortest distance to a surface and blocks the path of the light in the path of the light, in a state in which light beams are irradiated in the space. For example, referring to FIG. 4A, the ray casting may be performed such that a pixel value is sequentially acquired from a pixel present in the path of the light from the light source, when it is assumed that light beams are irradiated from a light source, which is disposed in a reference position (P1), in a first direction (d1) in the space forming a plurality of elements, e.g., a plurality of pixels. When the acquired pixel value is within a certain range, a pixel 24a corresponding to the acquired pixel value may be detected, thereby acquiring coordinates of the pixel 24a.

The processor 10 may detect the pixel 24a by using the above mentioned method, so as to detect the virtual data 24. In this case, the virtual data 24 may be the acquired pixel 24a itself, or the virtual data 24 may include the coordinates of the acquired pixel 24a. In addition, the virtual data 24 may be an image formed by the combination of the acquired pixel 24a, as illustrated in FIG. 4A.

The above mentioned ray casting may be performed in the path of the light in a plurality of directions (d1 to d3). For example, when the pixel 24a in the first direction (d1) is detected, the ray casting may be sequentially performed in a second direction (d2) and thus a pixel 24b in the second direction (d2) may be detected. In this case, an angle (θ1) between the first direction (d1) and the second direction (d2) may be defined by the user, the designer, or the processor 10.

Sequentially, the ray casting may be performed in a third direction (d3), and thus a pixel 24c in the third direction (d3) may be detected. An angle (θ2) between the second direction (d2) and the third direction (d3) may be defined by the user, the designer, or the processor 10. The angle (θ2) between the second direction (d2) and the third direction (d3) may be the same as or different from the angle (θ1) between the first direction (d1) and the second direction (d2).

When the ray casting is performed in all directions with respect to the reference position (P1), the plurality of pixel values 24a to 24c may be acquired, as illustrated in FIG. 4A. A group of the acquired plurality of pixel values 24a to 24c or a group of coordinates of each of the plurality of pixel values 24a to 24c may form the virtual data 24.

The number of the obtained pixels 24a to 24c may be different according to the size of the angle (e.g. θ1 and θ2)

between each ray cast. For example, when the angle (θ1 and θ2) between each direction (d1 to d3) is defined as the same angle θdef, the number of the acquired pixel 24a to 24c may be given as 360/θdef. For example, when the angle (θ1 and θ2) is 1 degree, the instances of the acquired virtual data may be 360.

As described above, the acquisition of the virtual data may be performed in each unit area 23a, and when the number of unit areas 23a in the entire map 22 is N, the total number of the virtual data 24 acquired in the entire map 22 may be given as N*360/θdef.

That the ray casting is sequentially performed in the plurality of directions (d1 to d3) may correspond to a case in which the movable object 1, to which the data collector 31, e.g., a camera is installed to face a certain direction, is virtually pivoted while acquiring image data about the vicinity thereof. In this case, the angle (θ1 and θ2) between each direction (d1 to d3) may correspond to a virtual direction angle. When the ray casting is performed in all directions, the movable object 1 may be virtually pivoted while acquiring image data about the vicinity thereof. When the angle (θ1 and θ2) between each direction (d1 to d3) is defined as θdef, a virtual rotation (θrotation) of the movable object 1 may be any one of 0 (zero) to 360−θdef.

As mentioned above, as the processor 10 acquires the plurality of pixels 24a to 24c, the processor 10 may acquire the virtual data 24 about all areas or at least one unit area 23a in the map 22. In addition, the processor 10 may acquire the virtual data 24 by using various methods considered by the designer.

Figure 4B:
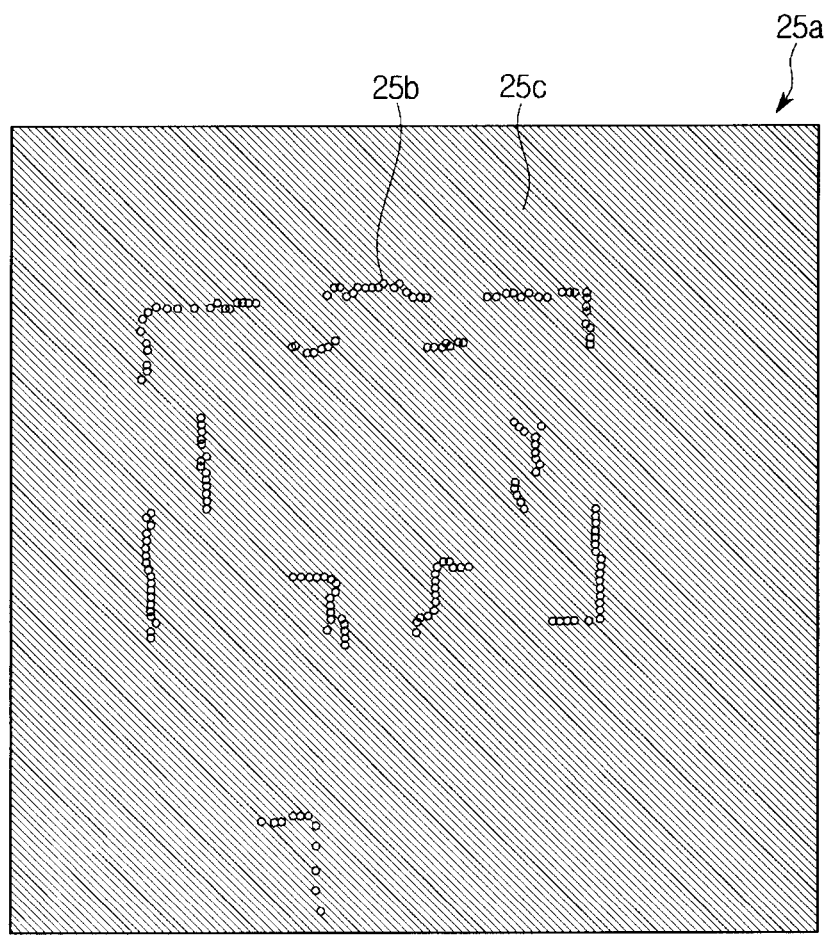
FIG. 4B is a view illustrating a binary image acquired based on the virtual data.

FIG. 4B is a view illustrating a binary image acquired based on the virtual data.

When the virtual data 24 is acquired, the processor 10 may convert the obtained virtual data 24 into processable data 25 that is processable by the algorithm 27. When the virtual data 24 about at least one unit area 23a is acquired, the processor 10 may convert the acquired virtual data 24 to the processable data 25 corresponding to the virtual data 24. When N*360/θdef of the virtual data 24 is acquired, N*360/θdef of the processable data 25 may be acquired.

According to an embodiment, the processable data 25 may include binary data 25a, as illustrated in FIG. 4B. For example, when the virtual data 24 is acquired in the image type, the processor 10 may convert a part 25b in which the pixel 24a to 24c is present, into 1 (one) and convert a part 25c in which the pixel 24a to 24c is not present, into 0 (zero), thereby acquiring binary data, e.g., a binary image 25a, corresponding to the virtual data 24. According to embodiments, the processor 10 may convert a part 25b in which the pixel 24a to 24c is present, into 0 (zero) and convert a part 25c in which the pixel 24a to 24c is not present, into 1 (one), thereby acquiring binary data, e.g., a binary image 25a, corresponding to the virtual data 24. Since the binary image has 0 (zero) and 1, the binary image may be relatively easily processed by the processor 10.

FIG. 5 is a diagram illustrating an example of a neural network, which is exemplified as a convolutional neural network Processor 10 may execute algorithm 27 to perform the learning by inputting the acquired binary image 25a (or data representing the binary image 25a) and the reference position (P1) corresponding to the acquired binary image 25a, to the algorithm 27, e.g., a convolution neural network algorithm 27a, so that the acquired binary image 25a corresponds to the coordinates 26 of the reference position (P1) in which the ray casting is performed. For example, the processor 10 may execute the convolution neural network algorithm 27a to perform the learning so that, when input values to the convolution neural network algorithm 27a represent the acquired binary image 25a, the coordinates 26 of the reference position (P1) corresponding to the acquired binary image 25a becomes an output value. Accordingly, the learning algorithm 28 may be trained.

As illustrated in FIG. 5, the convolution neural network algorithm 27a may include at least hidden layers l1, l2, and l3. At least one of hidden layers l1, l2, and l3 may include convolution layers c1 and c2, and pooling layers s1 and s2.

Convolution may be performed in the convolution layers c1 and c2. Accordingly, a feature map may be acquired in the convolution layers c1 and c2. By the convolution process, the input binary image 25a may be transformed and thus the size, e.g., the resolution, thereof may be reduced.

In the convolution layers c1 and c2, a convolution kernel, which is defined by the processor 10, may be applied to the input binary image 25a or entire or part of image, which is acquired by a sub-sampling performed in the pooling layers s1 and s2. Accordingly, a new pixel value may be calculated. Therefore, the feature map may be acquired by the calculated pixel value.

For example, when at least one area among the plurality of elements (e.g., pixels) forming the binary image 25a is selected, values, which correspond to at least two elements corresponding to the selected at least one area, may be summed or weighted summed, and thus a result value corresponding to the at least one area may be determined. By repeating the same process, a result value corresponding to the plurality of areas may be determined and thus the feature map may be acquired by combining the result values. In this case, the selected at least one area may be overlapped. In other words, the elements included in any one selected area may be included in another selected area.

The feature map may be transmitted to the pooling layers s1 and s2. The transmitted result value may be in the form of a two-dimensional matrix. According to embodiments, an activation function may be further applied to the acquired feature map.

In the pooling layers s1 and s2, the feature map may be relatively further reduced. In the pooling layer s1 and s2, at least one of the feature map may be selected and the sub-sampling may be performed based on the value of the plurality of elements (e.g., pixels) in the at least one area. For example, the sub-sampling may be performed by average pooling, i.e., calculating an average of the value of the plurality of elements in the at least one area, or by max pooling, i.e., selecting a value corresponding to a certain reference among the value of the plurality of elements, e.g., a maximum value.

Result data acquired by the sub-sampling in the pooling layer s1 and s2 may be transmitted to another layer l2. In the other layer l2, the convolution and the sub-sampling may be performed on the result data transmitted to the other layer l2, again.

The acquired result data through the convolution layer c1 and c2 and the pooling layer s1 and s2 may be transmitted to a feedforward layer l3. The result data may be used as an input value of the feedforward layer l3.

According to an embodiment, the acquired data may be recognized and/or classified in the feedforward layer l3. The feedforward layer l3 may include a fully connected neural network. The fully connected neural network may include a plurality of neurons, and at least two neurons in the plurality of neurons may be connected to each other so that an input and an output are fully connected.

The output of the feedforward layer I3 may be given as the coordinates 26 of the reference position (P1) corresponding the binary image 25a.

According to an embodiment, the feedforward layer I3 may be implemented by using regression method, e.g., linear regression or logistic regression.

Therefore, the input binary image 25a may be input to the feedforward layer I3 after being reduced by the convolution layer c1 and c2 and the pooling layer s1 and s2, and the feedforward layer I3 may be formed so that the binary image 25a corresponds to the coordinates 26 of the reference position (P1). Accordingly, the learning algorithm 28 may be trained.

As mentioned above, when the plurality of virtual data 24, e.g., N*360/θdef virtual data, is acquired by the ray casting in the plurality of unit areas 23a, each virtual data 24 may be substituted to the hidden layers l1, l2 and l3, simultaneously or sequentially, and thus the processor 10 may acquire/train the learning algorithm 28 which performs learning to allow the plurality of virtual data 24 to correspond to the coordinates 26 of the plurality of reference positions (P1).

The learning algorithm 28 may be stored in the storage 20, as described above.

The acquisition of the learning algorithm 28 may be performed before the movable object 1 acquires the actual data. In addition, the learning algorithm 28 may be periodically updated or continually updated at any time. The update of the learning algorithm 28 may be performed after the actual data is acquired or the position of the movable object 1 is determined based on the actual data.

Figure 6:
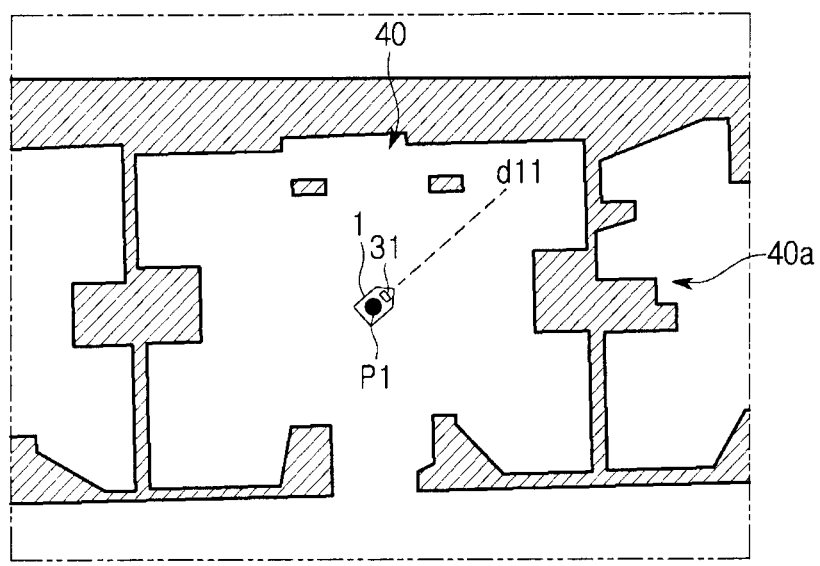
FIG. 6 is a first view illustrating an example in which the movable object acquires the actual data.
Figure 7:
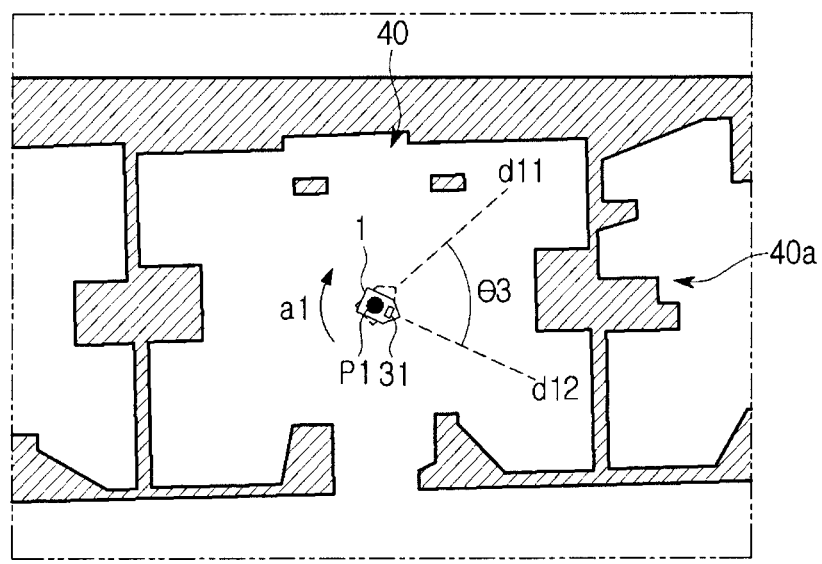
FIG. 7 is a second view illustrating an example in which the movable object acquires the actual data.
Figure 8A:
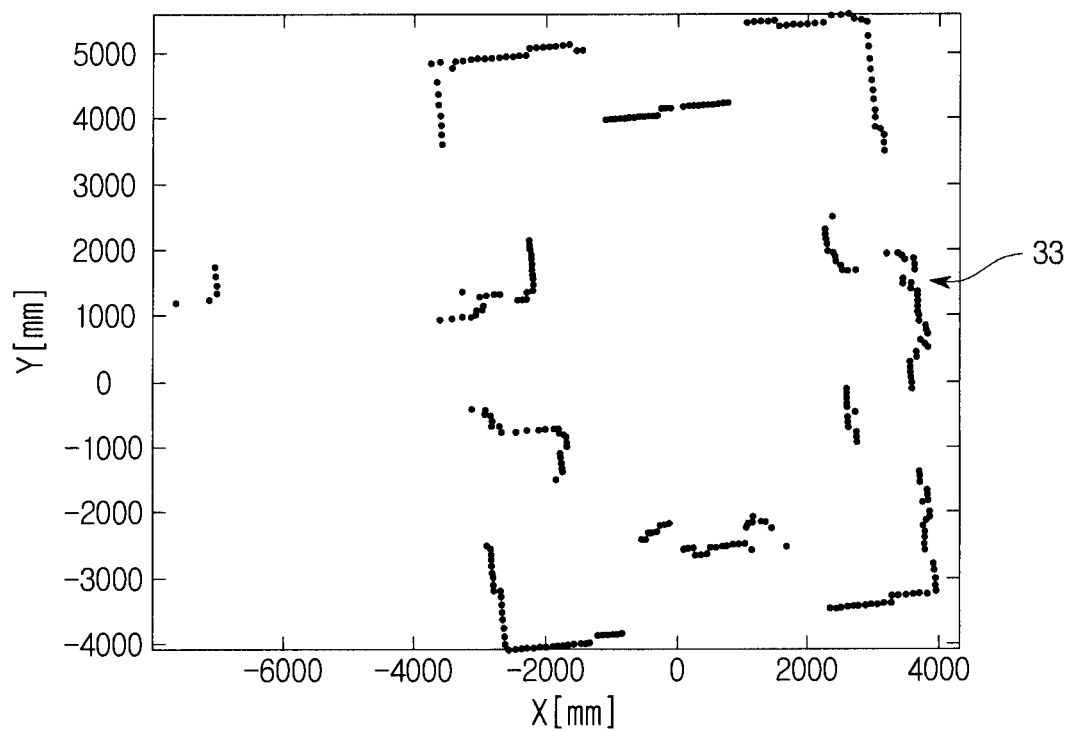
FIG. 8A is a view illustrating an example of the actual data.

FIG. 6 is a first view illustrating an example in which the movable object acquires the actual data, and FIG. 7 is a second view illustrating an example in which the movable object acquires the actual data. FIG. 8A is a view illustrating an example of the actual data.

As illustrated in FIGS. 6 and 7, in a state in which the movable object 1 is placed in any one space 40, when an actual position acquisition process of the movable object 1 starts, the movable object 1 may collect information related to a target 40a present in the vicinity of the movable object 1 by using the data collector 31 provided in the movable object 1.

The target 40a present in the vicinity of the movable object 1 is defined in various ways according to the space in which the movable object 1 travels. For example, the target 40a may include inner walls or outer walls of buildings, columns, doors, furniture, door sills, pipes, various electronic products, machines, and various workpiece and/or various items capable of occupying the space.

When the actual position process is started, the movable object 1 may control the data collector 31 to face a certain direction (d11) and then to stop; and collect actual data 33 related to the certain direction (d11). The actual data may be the same type of data as the virtual data, as illustrated in FIG. 8A. For example, the actual data 33 may be implemented by a group of points having the coordinates corresponding to position of each target 40a, as illustrated in FIG. 8A. The coordinates of each point may represent a relative position of the target 40a in the vicinity with respect to the actual position (p2) corresponding to the origin.

In one embodiment, the movable object 1 may acquire actual data 33 related to a single direction (d11), as illustrated in FIG. 6. In another embodiment, the movable object 1 may acquire actual data 33 corresponding to a plurality of directions (d11 and d12), as illustrated in FIG. 7. For example, the movable object 1 may acquire the actual data related to the single direction (d11) by using the data collector 31, as illustrated in FIG. 6, and sequentially, the movable object 1 may acquire the actual data 33 related to another direction (d12) by using the data collector 31, as illustrated in FIG. 7.

Particularly, for example, after acquiring the actual data related to one direction (d11) is completed, the movable object 1 may rotate by a predetermined angle (Θ3) in a predetermined direction (a1) so that the data collector 31 faces another direction (d12). The rotation may be performed by the operation of the driver 35 according to the control of the processor 10. When the rotation by the predetermined angle (Θ3) is completed, the data collector 31 of the movable object 1 may start to collect actual data related to a new direction (d12). Accordingly, it may be possible to collect the actual data 33 related to the plurality of directions (d11 and d12).

According to embodiments, the movable object 1 may repeatedly perform the operation illustrated in FIG. 7, and thus the movable object 1 may acquire actual data 33 related to all directions about the vicinity of the movable object 1.

The processor 10 of the movable object 1 may determine whether to rotate the movable object 1 according to a data collection range of the data collector 31. When the data collection range of the data collector 31, e.g., an angle of view, is sufficiently wide, the processor 10 may control the movable object 1 so that the movable object 1 acquires the actual data 33 about a single direction (d11). When the data collection range of the data collector 31 is small, the processor 10 may control the movable object 1 so that the movable object 1 acquires the plurality of actual data 33 corresponding to the plurality of directions (d11 and d12).

According to an embodiment, the data collector 31 may be implemented using an omni-directional camera. In this case, the movable object 1 may acquire the actual data 33 about all directions, in a stopped state, without the rotation.

Figure 8B:
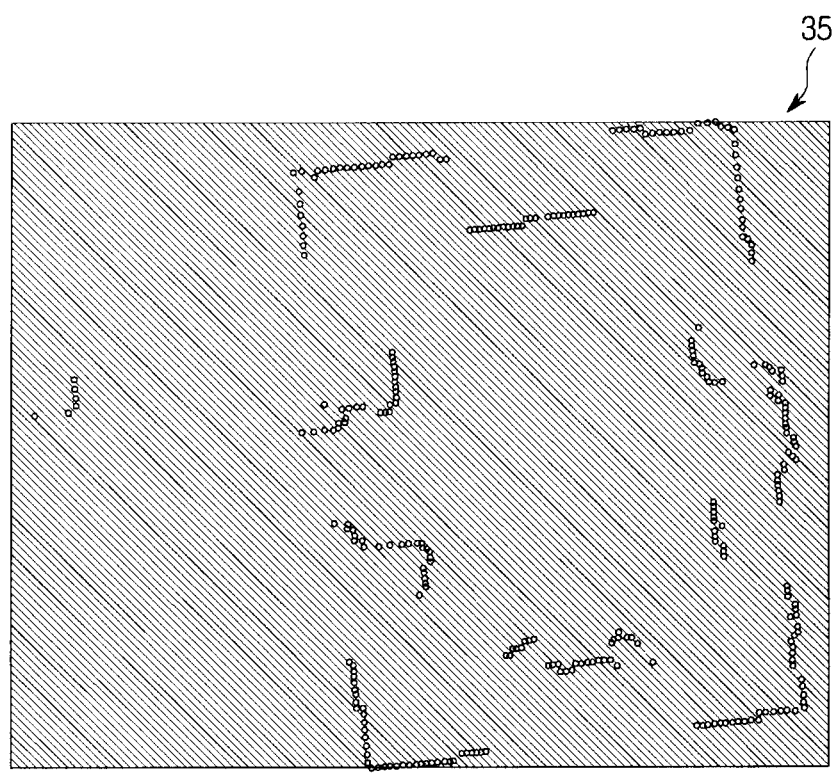
FIG. 8B is a view illustrating a binary image acquired based on the actual data.

FIG. 8B is a view illustrating a binary image acquired based on the actual data. As illustrated in FIG. 8A, when the actual data 33 is acquired, the acquired actual data 33 may be converted into the processable data 35, as shown in FIG. 8B. The processable data 35 may include binary data, e.g., a binary image.

The conversion from the actual data 33 to the binary data 35 may be performed as the same method as the conversion from the virtual data 24 to the binary data 25a. In other words, a value of 1 (one) may be assigned to each point of the actual data 33 and a value of 0 (zero) may be assigned to other points (i.e., except for the point having the value of 1), thereby acquiring the binary data 35 corresponding to the actual data 33.

The processor 10 may input the acquired binary data 35 to the learning algorithm 28 so as to acquire information related to a position of the movable object 1. Such information may be expressed by predetermined coordinates, wherein the predetermined coordinates may be defined by an axis of coordinates that is set with respect a predetermined origin.

As mentioned above, when inputting the binary data 35, which is acquired based on the actual data 33, to the learning algorithm 28, information related to the position of the movable object 1 corresponding to the binary data 35 may be output, since the learning algorithm 28 learns to acquire the coordinates 26 of the reference position (P1) corresponding to the input binary image 25a. Therefore, the processor 10 may acquire the information related to the position of the movable object 1 corresponding to the actual data 33.

Figure 9:
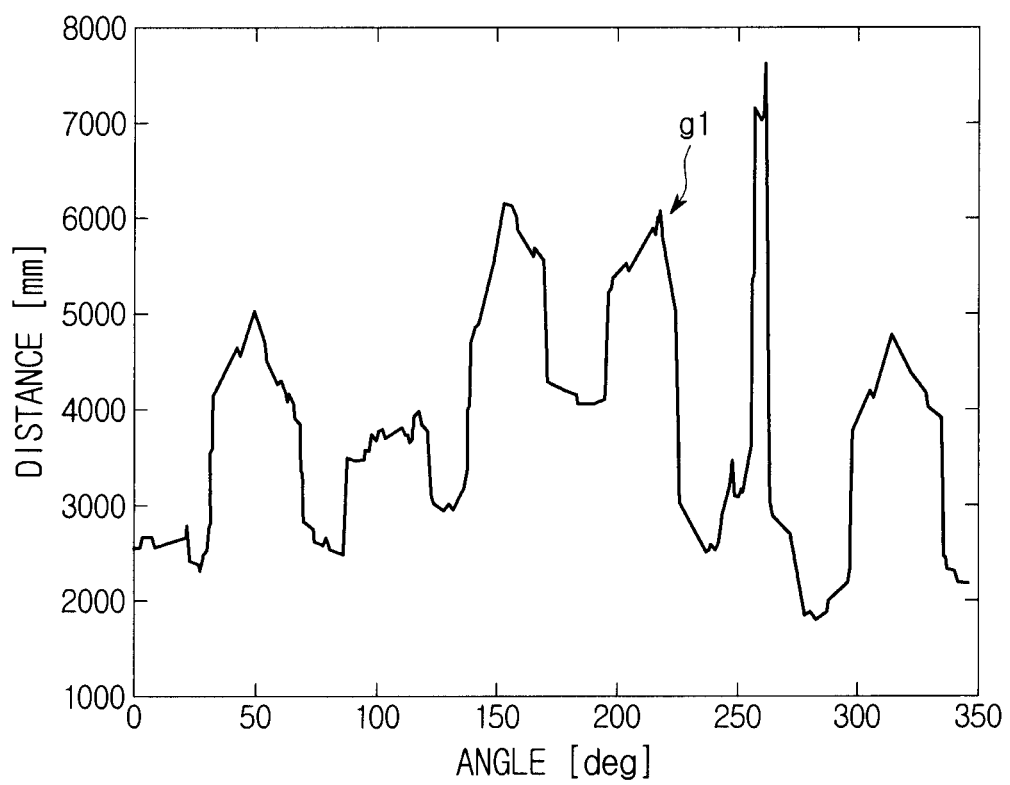
FIG. 9 is a graph illustrating a relationship between an angle and a distance to a target, which are acquired based on the actual data.
Figure 10:
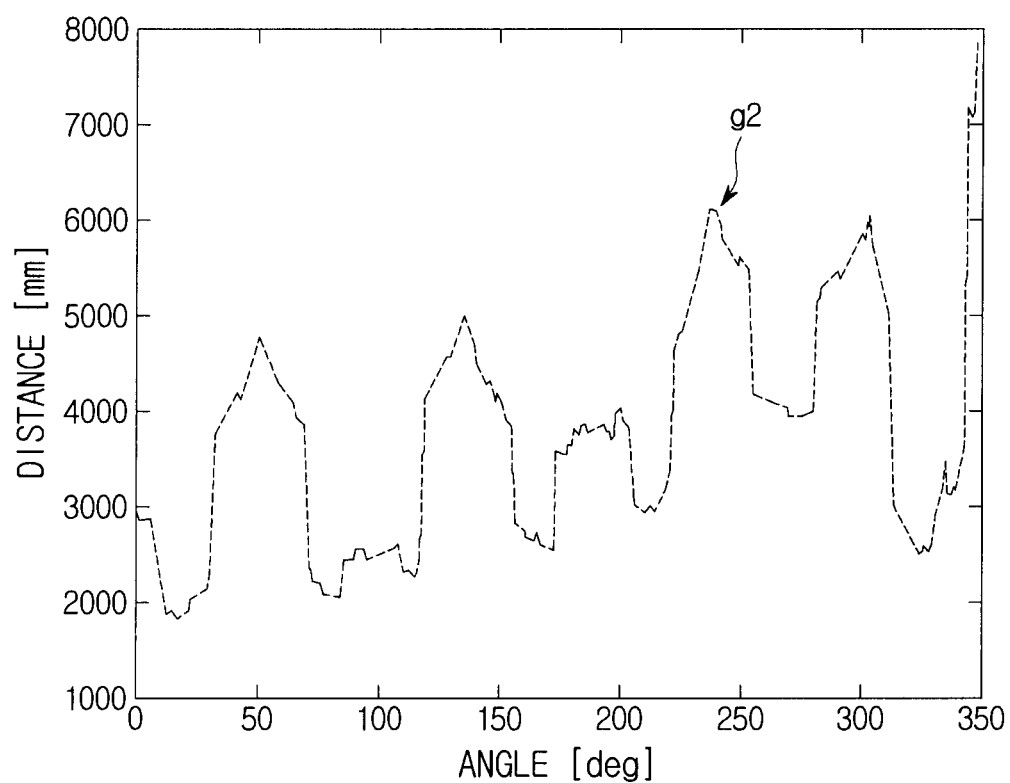
FIG. 10 is a graph illustrating a relationship between an angle and a distance to a target, which are acquired based on the virtual data.

FIG. 9 is a graph illustrating a relationship between an angle and a distance to a target, which are acquired based on the actual data, and FIG. 10 is a graph illustrating a relationship between an angle and a distance to a target, which are acquired based on the virtual data.

The processor 10 may determine an actual relative position of a robot cleaner 100 with respect to an actual position, based on the actual data 33. The actual relative position may include information (g1) related to the relationship between an angle (θ) and a distance (r) to a target.

As shown in FIG. 9, a relative position of a certain position (p3, not shown) with respect to the position (p2, not shown) in which the movable object 1 is placed, may be expressed by coordinates on the x-axis and y-axis, or an angle (θ) and distance (r). That is, the relative position of the certain position (p3) may be defined by an angle (θ) between a line (d22) connecting the position (p) in which the movable object 1 is placed, to the certain position (p3), and the reference direction (d21), and a distance (r) between the position (p) in which the movable object 1 is placed and the certain position (p3). The reference direction (d21) may be arbitrarily defined by the user, the designer or the processor 10. For example, the reference direction (d21) may be the front side of the movable object 1.

The processor 10 may convert the coordinates of the certain position (p3) into an angle (θ) and a distance (r), by converting the rectangular coordinate system to the polar coordinate system. Accordingly, the processor 10 may acquire a relationship (g1) between the angle (θ) and the distance (r) about the certain position (p3). Each point in the actual data 33 may be expressed in the form of graph by using the angle (θ) and the distance (r), as illustrated in FIG. 9.

In addition, the processor 10 may determine a virtual relative position from the virtual data 24. The virtual relative position may include a distance between a target present in the map, and an arbitrary position on the map (i.e., a position in which the robot cleaner 1 is assumed to be virtually present). The virtual relative position may include an angle between directions about a target present in the map, with respect to the reference direction.

The processor 10 may acquire a relationship (g2) between an angle and a distance about the virtual data 24 in the same method as the method for acquiring the relationship between angle (θ) and the distance (r) about the actual data 33. In this case, the processor 10 may select a single position in the map 22 and 23 and acquire an angle and a distance about a target with respect to the selected single position on the map 22 and 23, thereby acquiring the relationship (g2) between an angle and a distance about the virtual data 24. A single position on the map 22 and 23 may be the same as a position in which the actual data 33 of the movable object 1 is acquired, i.e., a position in which the movable object 100 is currently present.

The relationship (g2) between the angle and the distance about the virtual data 24 may be expressed in the form of graph, as illustrated in FIG. 10.

Figure 11A:
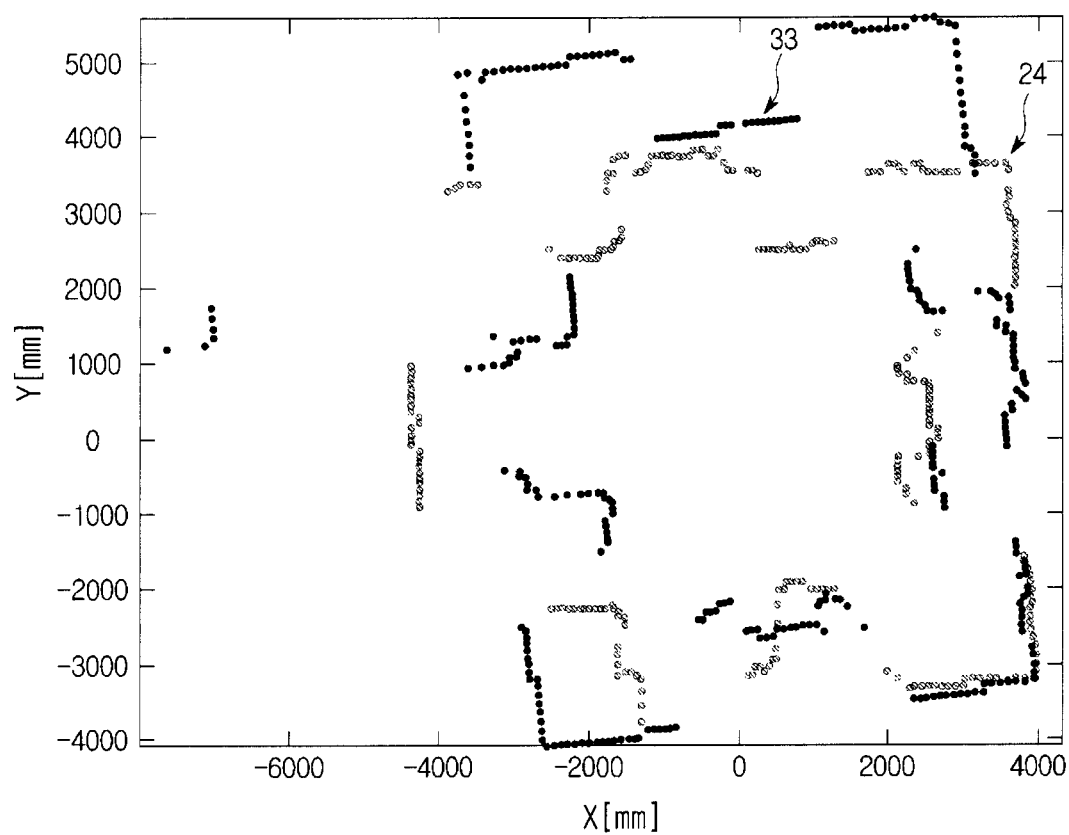
FIG. 11A is a first view illustrating a difference between a relationship between an angle and a distance which are acquired based on the actual data, and a relationship between an angle and a distance which are acquired based on the virtual data.
Figure 11B:
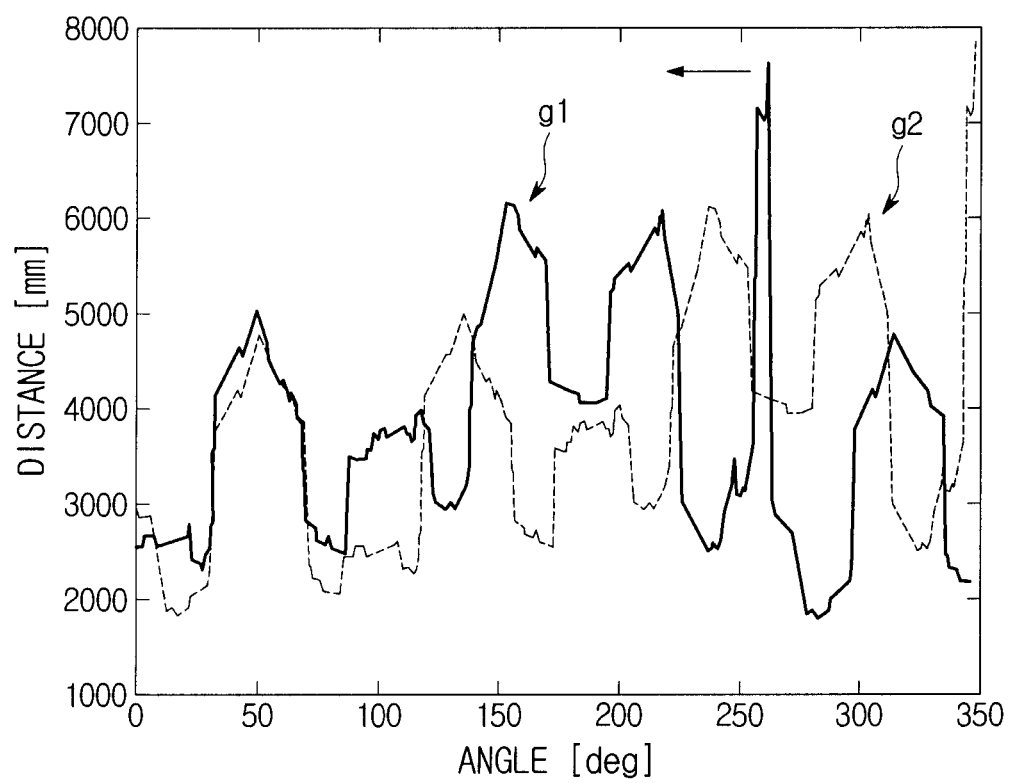
FIG. 11B is a second view illustrating the difference between the relationship between the angle and the distance which are acquired based on the actual data, and the relationship between the angle and the distance which are acquired based on the virtual data.

FIG. 11A is a first view illustrating a difference between a relationship between an angle and a distance which are acquired based on the actual data, and a relationship between an angle and a distance which are acquired based on the virtual data. FIG. 11B is a second view illustrating the difference between the relationship between the angle and the distance which are acquired based on the actual data, and the relationship between the angle and the distance which are acquired based on the virtual data.

Referring to FIG. 11A, the relationship (g1) between the angle and the distance about the actual data 33 and the relationship (g2) between the angle and the distance about the virtual data 24 may be not identical to each other. When the movable object 1 acquires the actual data 33 related to a direction different from a case of acquiring the virtual data 24, the actual data 33 may be dislocated by a certain angle (θ4) with respect to the virtual data 24, as illustrated in FIG. 11B. Therefore, the relationship (g1) between the angle and the distance about the actual data 33 and the relationship (g2) between the angle and the distance about the virtual data 24 may be not identical to each other.

Figure 12A:
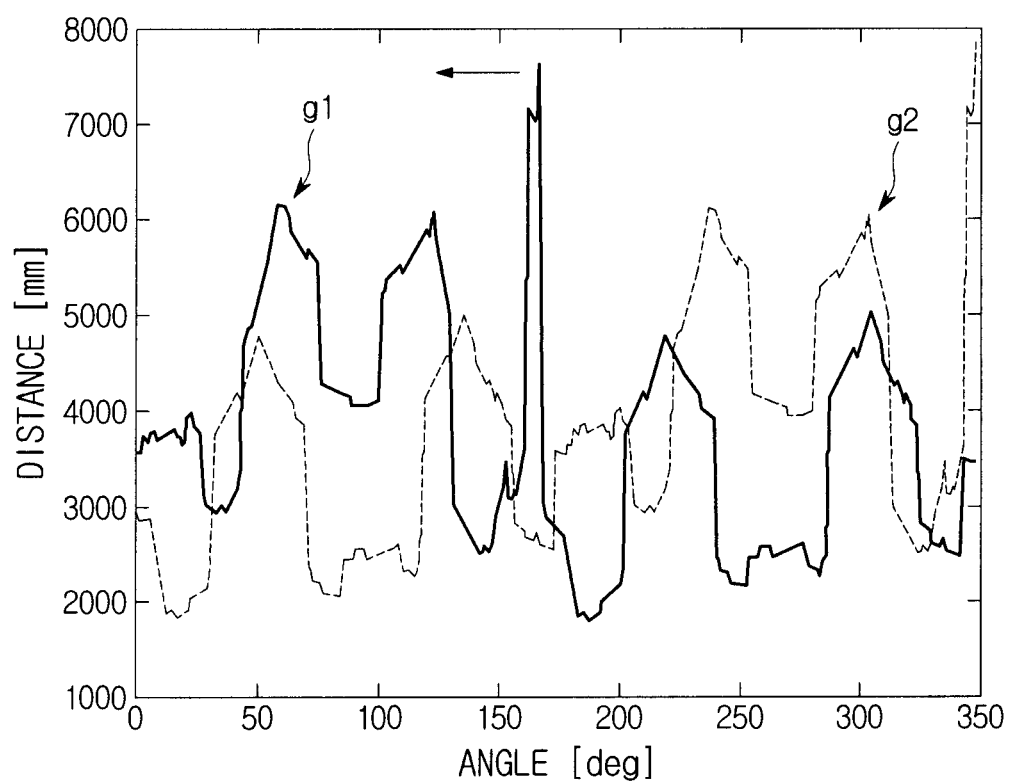
FIG. 12A is a third view illustrating the difference between the relationship between the angle and the distance which are acquired based on the actual data, and the relationship between the angle and the distance which are acquired based on the virtual data.
Figure 12B:
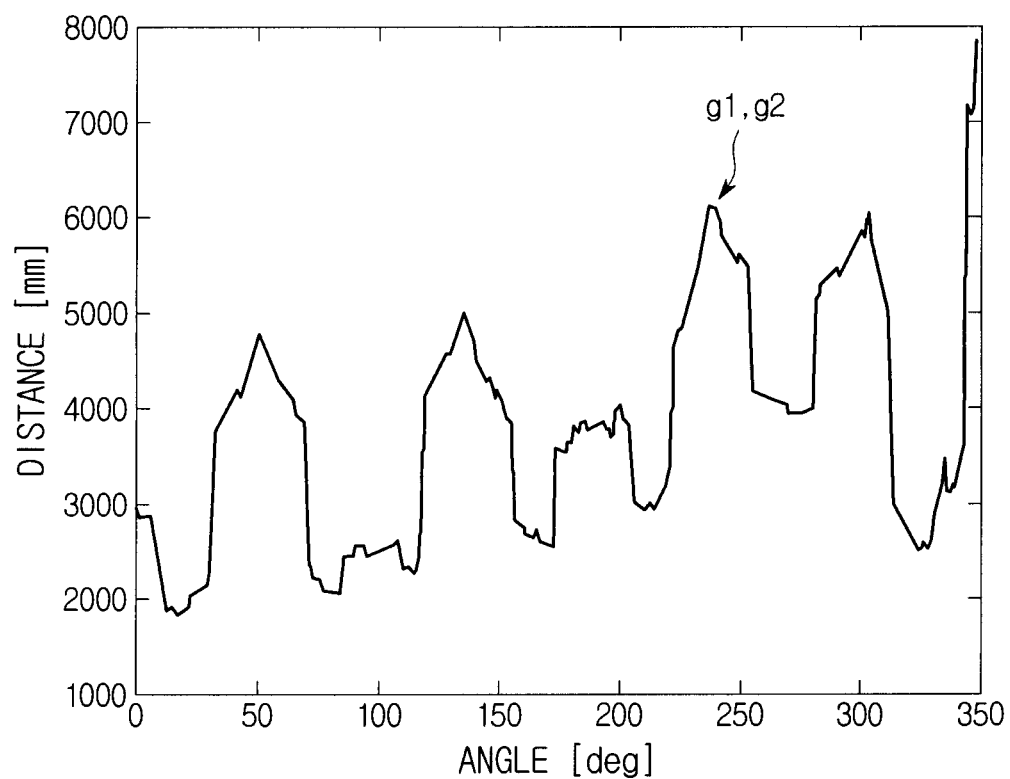
FIG. 12B is a fourth view illustrating the difference between the relationship between the angle and the distance which are acquired based on the actual data, and the relationship between the angle and the distance which are acquired based on the virtual data.

FIG. 12A is a third view illustrating the difference between the relationship between the angle and the distance which are acquired based on the actual data, and the relationship between the angle and the distance which are acquired based on the virtual data. FIG. 12B is a fourth view illustrating the difference between the relationship between the angle and the distance which are acquired based on the actual data, and the relationship between the angle and the distance which are acquired based on the virtual data.

In order to measure a direction angle of the movable object 1, the processor 10 may shift at least one of the relationship (g1) between the angle and the distance about the actual data 33 and the relationship (g2) between the angle and the distance about the virtual data 24, with respect to an axis indicating an angle, e.g., the X-axis, as illustrated in FIG. 12A. The direction angle may indicate that how much angle is different between a direction to which the front portion of the movable object 1 faces and the reference direction. The reference direction may be arbitrarily defined by the user, the designer and/or the processor 10.

As illustrated in FIG. 12B, while shifting the at least one of the relationship (g1) between the angle and the distance about the actual data 33 and the relationship (g2) between the angle and the distance about the virtual data 24, when the relationship (g1) between the angle and the distance about the actual data 33 and the relationship (g2) between the angle and the distance about the actual data 24 are identical with each other, the processor 10 may determine a shift degree of the at least one of the relationship (g1) between the angle and the distance about the actual data 33 and the relationship (g2) between the angle and the distance about the virtual data 24, and determine an angle corresponding to the shift degree, thereby determining the direction angle of the movable object 1.

When the relationship (g1) between the angle and the distance about the actual data 33 and the relationship (g2) between the angle and the distance about the actual data 24 are identical with each other, as the relationship (g1) between the angle and the distance about the actual data 33 is shifted to the right side of the graph by a certain angle, e.g., 80 degrees, it may be determined that the movable object 1 is rotated by a certain angle, e.g., 80 degrees.

Therefore, the processor 10 may determine the rotation direction and the rotation degree (i.e., rotation angle) of the movable object 1.

Hereinafter a robot cleaner will be described as an example of the movable object with reference to FIGS. 13 to 19.

Figure 13:
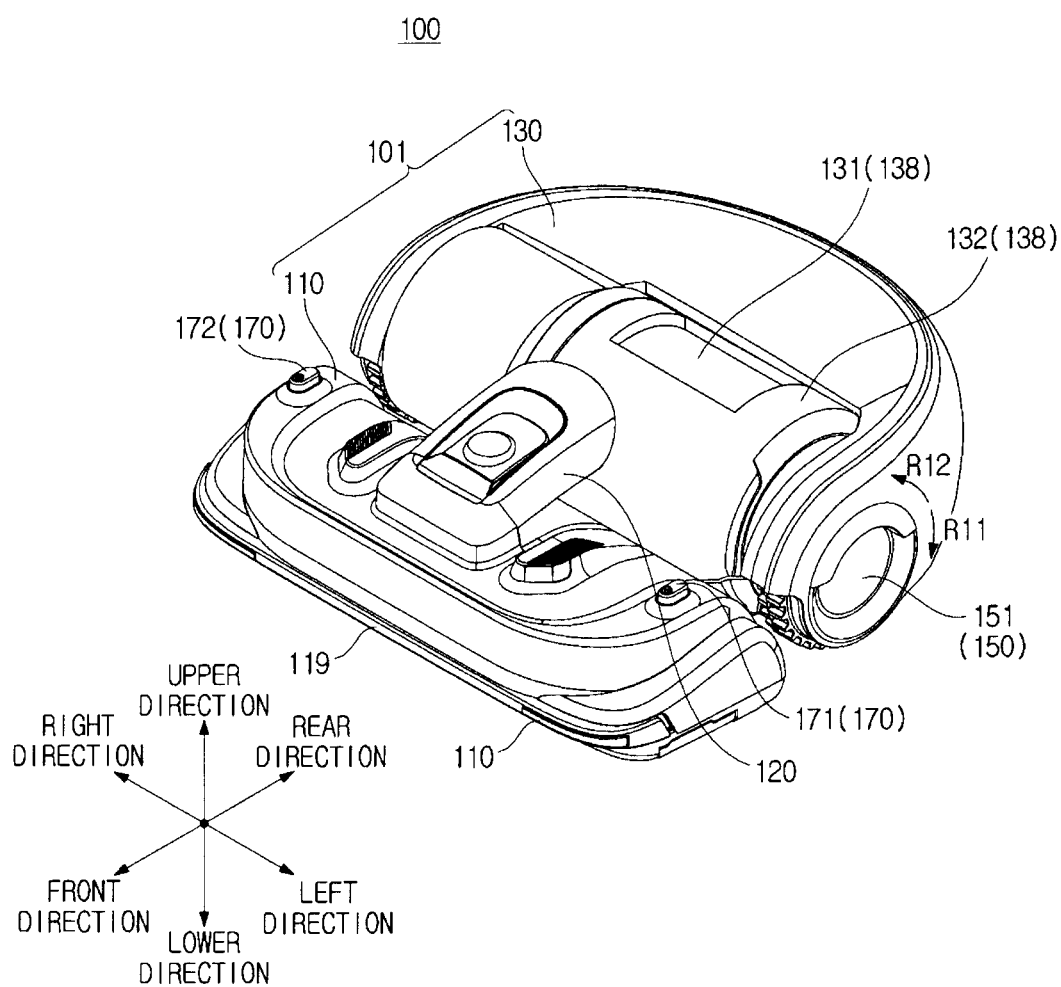
FIG. 13 is a perspective view illustrating a robot cleaner according to an embodiment.
Figure 14A:
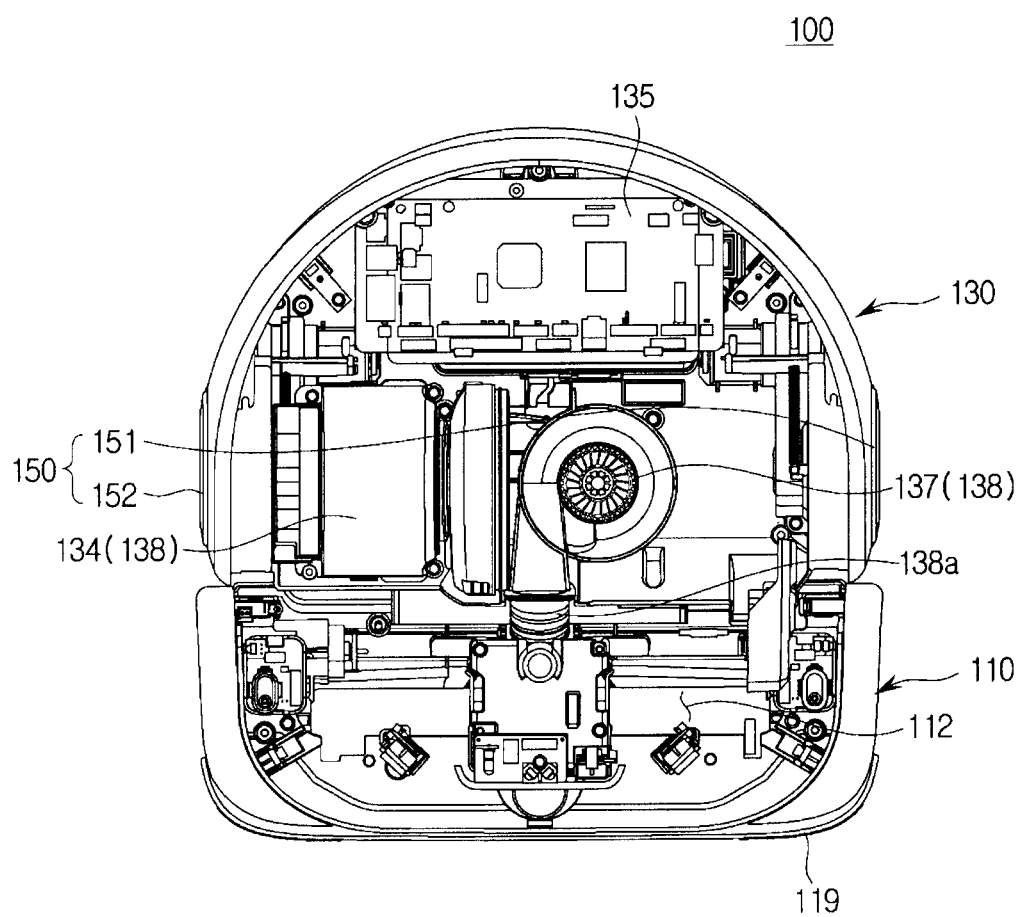
FIG. 14A is a plan view illustrating an internal structure of the robot cleaner according to an embodiment.
Figure 14B:
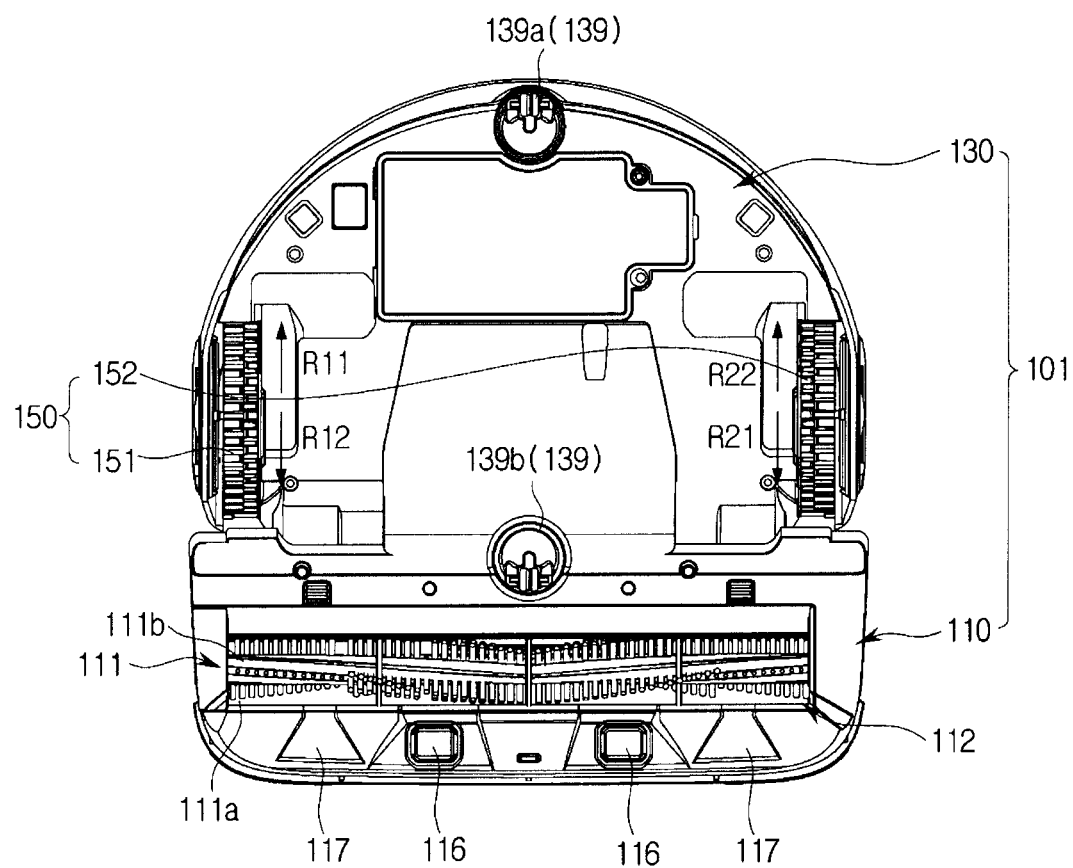
FIG. 14B is a bottom view illustrating the robot cleaner according to an embodiment.

FIG. 13 is a perspective view illustrating a robot cleaner according to an embodiment, FIG. 14A is a plan view illustrating an internal structure of the robot cleaner according to an embodiment, and FIG. 14B is a bottom view illustrating the robot cleaner according to an embodiment. FIG. 14A illustrates that a dust collecting box 132 of FIG. 13 is separated from the robot cleaner.

In FIGS. 13 to 14B, with respect to the center of the robot cleaner, a direction in which a suction portion is formed may be defined as a front direction and a direction opposite to the front direction may be defined as a rear direction. When the robot cleaner operates in a conventional manner, a direction adjacent to the ground may be defined as a lower direction, and a direction opposite to the lower direction may be defined as an upper direction. One direction of a line perpendicular to a line connecting the front direction to the rear direction may be defined as the left direction and a direction opposite to the left direction may be defined as the right direction. In addition, a lateral direction may be defined to include at least one of the left direction and the right direction.

As illustrated in FIGS. 13 to 14B, the robot cleaner 100 may include a body 101 forming an appearance of the robot cleaner 100. The body 101 may be formed by a single external case or more than two external case, which are combined with each other.

The body 101 may include a first body 110 formed in the front side and a second body 130 formed in the rear side of the first body 110. The first body 110 and the second body 130 may be integrally formed or alternatively, the first body 110 and the second body 130 may be separately manufactured and then coupled to each other. When the first body 110 and the second body 130 are separately manufactured and then coupled to each other, a connecting member 120 connecting the first body 110 to the second body 130 may be formed between the first body 110 and the second body 130.

According to an embodiment, a variety of components may be provided in the first body 110, wherein the components are configured to collect a variety of information related to the driving of the robot cleaner 100 or configured to collect the dust on the ground.

The front surface of the first body 110 may be formed in a predetermined shape to suction the dust in the vicinity of a target while in contact with the target, e.g., a wall placed in the front side and the lateral side with respect to the driving direction. For example, when viewing the front surface of the first body 110 in the upper direction, the first body 110 may be formed in the rectangular, circular, or oval shape.

A bumper 199 may be coupled to the front side of the first body 110 to mitigate the noise and shock generated when the robot cleaner 100 collides with the wall during the robot cleaner 100 drives. A buffer member 118 may be additionally coupled to the bumper 119 to support the damping.

An inlet port 112 to which the dust gathered by a brush module 111 is suctioned may be provided on the lower surface of the first body 110. The dust suctioned via the inlet port 112 may be transmitted to the inner space of a dust collecting portion 138 by passing through at least one tube 138a. The inlet port 112 may be extended from the left direction to the right direction of the first body 110.

The brush module 111 may be provided on the lower surface of the first body 110 to collect the dust on the ground, wherein an external surface of the brush module 111 is provided with a plurality of protrusions with a certain length.

The brush module 111 of the first body 110 may include a rotary member 111b pivotable with respect to a certain shaft and at least one protrusion 111a formed in a certain shape on an outer circumferential surface of the rotary member 111b. The rotary member 111b may be formed along the longitudinal direction of the inlet port 112 formed in the lower surface of the first body 110. The protrusion 111a may be formed by using a rigid material and/or a flexible material, and the protrusion 111a may sweep the dust on the ground according to the rotation of the rotary member 111b.

The brush module 111 may move the dust on the ground in at least one direction of the rear direction and the upper direction according to the rotation of the rotary member 111b so that the dust on the ground is suctioned into the inside of the first body 110 through the inlet port 112.

At least one guide flow path 117 guiding the dust to the brush module 111 may be provided in the lower end portion of the first body 110 for improving the suction force. The guide flow path 117 may be formed in the front side of the brush module 111.

A charge terminal 116 charging the robot cleaner 100 may be provided in the lower end portion of the first body 110. When the charge terminal 116 is coupled to a terminal formed in a docking station (not shown), the robot cleaner 100 may be electrically connected to the docking station, and the commercial current supplied to the docking station may be transmitted to the power source 123 (refer to FIG. 15) of the robot cleaner 100 via the charge terminal 116.

According to an embodiment, in the second body 130, a portion for storing the collected dust or for controlling a variety of operations related to the robot cleaner 100 may be provided.

A drive module 150 driving the body may be provided in the second body 130. The drive module 150 may include a first driving wheel 151 and a second driving wheel 152 for driving the body. Each driving wheel 151 and 152 may be rotatably coupled to opposite sides of the second body 130 to be rotatable in a certain direction R11, R12, R21, and R22. For example, when the first driving wheel 151 may be installed on the left direction of the second body 130 and the second driving wheel 152 may be installed on the right direction of the second body 130.

The first driving wheel 151 and the second driving wheel 152 may be rotated in the same direction or opposite directions.

For example, when the first driving wheel 151 is rotated clockwise (R11) at a predetermined angular speed, as seen from the left direction and the second driving wheel 152 is rotated clockwise (R22) at the same angular speed, as seen from the right direction, the second body 130 may be rotated at a certain position and thus the robot cleaner 100 may be rotated in the position without changing the position. When the first driving wheel 151 and the second driving wheel 152 are rotated in opposite directions (R12 and R21), the operation may be performed, the same as mentioned above.

For example, when the first driving wheel 151 is rotated clockwise (R11) at a predetermined angular speed, as seen from the left direction and the second driving wheel 152 is rotated counterclockwise (R21) at the same angular speed, as seen from the right direction, the second body 130 may be moved backward. In contrast, when the first driving wheel 151 is rotated counterclockwise (R12) and the second driving wheel 152 is rotated clockwise (R22), the second body 130 may be moved forward. Accordingly, the robot cleaner 100 may be moved in the front direction or the rear direction.

The first driving wheel 151 and the second driving wheel 152 may be rotated according to the drive of a driver 181 and 182 (refer to FIG. 10) corresponding to the first driving wheel 151 and the second driving wheel 152.

In the second body 130, at least one roller 139 may be installed to support the rotation movement of the body 101. The roller 139 may be implemented by using a spherical member configured to be rotatable by 360 degree.

For example, the roller 139 may be provided on the lower surface of the second body 130.

According to an embodiment, the roller 139 may include a first roller 139*a* and a second roller 139*b*, wherein the first roller 139*a* and the second roller 139*b* are provided on different positions.

Particularly, for example, the first roller 139*a* may be installed in the rear side of the lower surface of the second body 130 so as to support the robot cleaner 100 from the rear side, when moving and/or rotating. The second roller 139*b* may be installed in between the first body 110 and the second body 130 so as to support the robot cleaner 100 from the front side or the vicinity thereof, when moving and/or rotating.

The first roller 139*a* and the second roller 139*b* may be coupled to a position to support the center of gravity of the body 101. In this case, the rollers 139*a* and 139*b* may be installed in a position such that a distance from the position in which the rollers 139*a* and 139*b* are installed to the first driving wheel 151 and a distance from the position in which the rollers 139*a* and 139*b* are installed to the second driving wheel 152 are the same. When the rollers 139*a* and 139*b* are installed as mentioned above, the driving load generated during the driving of the body may be minimized.

At least one of an input 121 (refer to FIG. 15) receiving a certain command from a user, e.g., a button or a knob, and a display 122 (refer to FIG. 5) displaying a state of the robot cleaner 100 or providing a variety information to a user may be provided on an upper surface of the second body 130. The input 121 and the display 122 may be omitted according to embodiments.

Referring to FIG. 14A, a substrate 135 may be installed in the inside of the second body 130 for various kinds of electronic controls of the robot cleaner 100.

Figure 15:
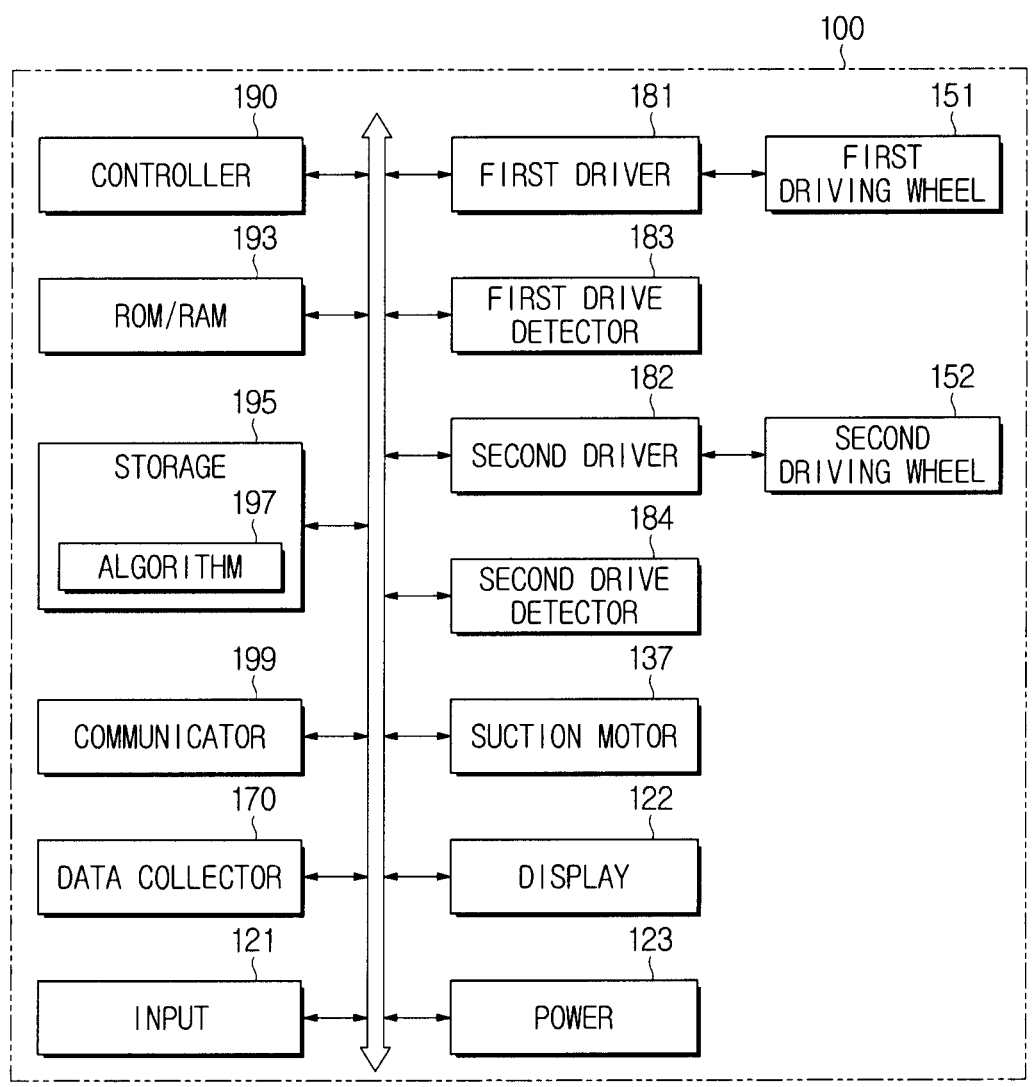
FIG. 15 is a control block diagram illustrating the robot cleaner according to an embodiment.

A variety of components may be installed on the substrate 135 to perform the function of a controller 190 (refer to FIG. 15), a ROM/RAM 193 (refer to FIG. 15), or a storage 195 (refer to FIG. 15). For example, at least one semiconductor chip, circuit and/or a related component serving as the controller 190, and a component such as a communication chip and an antenna serving as a communicator 199 may be installed on the substrate 135.

As needed, a power source 123 may be installed in the inside of the second body 130 to supply the power for controlling the support body. According to an embodiment, the power source 123 may be disposed in the rear side of the dust collecting portion 138.

According to an embodiment, the power source 123 may include a battery, wherein the battery may be a secondary battery that is rechargeable. When the body 101 is coupled to the docking station separately provided, the battery may be charged by the commercial power supplied from the docking station.

The dust collecting portion 138 storing the dust may be provided in the inside of the second body 130. The dust collecting portion 138 may include a suction motor 134 providing the power for suctioning the dust and the dust collecting box 132 storing the suctioned dust.

As illustrated in FIG. 13, the dust collecting box 132 may be provided such that at least one portion thereof is exposed to the outside. In this case, an opening may be formed on the external case of the second body 130 corresponding to the upper surface of the dust collecting box 132. According to embodiments, a case configured to be openable may be further coupled to the opening. In addition, the external case of the dust collecting box 132 may be formed of a transparent material, e.g., glass or synthetic resin. Accordingly, the user may check the amount of the dust stored in the dust collecting box 132 with naked eyes.

The dust collecting box 132 may be provided such that a user can detach the dust collecting box 132 from the second body 130. For this, a gripping portion 131 having a certain shape may be installed in the dust collecting box 132. The gripping portion 131 may be installed on one surface of the dust collecting box 132, which is exposed to the outside.

A blowing fan 137 may be further provided in the dust collecting box 132 to suction the dust and move the dust to the inside of the dust collecting box 132. The blowing fan 137 may start to rotate according to an operation of the suction motor 134, and thus the dust may be suctioned to the inside of the dust collecting box 132 according to the rotation of the blowing fan 137 and then stacked in the inside of the dust collecting box 132.

The suction motor 134 may be coupled to the lateral surface of the dust collecting box 132. The suction motor 134 may include a DC motor, AC motor, a brushless DC motor (BLDC motor) or a linear induction motor. The suction motor 134 may allow the robot cleaner 100 to gather the dust on the ground by starting the operation according to the control of the controller 190.

The first driving wheel 151 and the second driving wheel 152 may be disposed on opposite lateral surfaces of the dust collecting box 132 and the suction motor 134, and thus the dust collecting box 132, the suction motor 134 and each driving wheel 151 and 152 may be disposed in parallel with the transverse direction of the body.

According to an embodiment, the data collector 170 may be further installed in at least one upper surface of the first body 110 and the second body 130.

The data collector 170 may detect an object present in at least one direction among the front, lateral and rear direction of the robot cleaner 100. In this case, data acquired by the data collector 170 may be actual data related to the vicinity of the robot cleaner 100. The actual data acquired by the data collector 170 may be transmitted to the controller 190 through at least one circuit or wire.

The data collector 170 may be implemented by using a visible light camera, an infrared camera, an obstacle sensor or a distance sensor, which are configured to collect information related to a certain direction. In this case, the visible light camera, the infrared camera, the obstacle sensor or the distance sensor may be installed in at least one of the first body 110 and the second body 130 to image an image about the front direction or to detect an object in the front direction. According to embodiments, the data collector 170 may be implemented by using an omnidirectional camera, and when the data collector 170 is an omnidirectional camera, the omnidirectional camera may be installed in one position for properly acquiring an image in all directions.

Hereinafter a control flow of the robot cleaner will be described with reference to FIG. 15.

FIG. 15 is a control block diagram illustrating the robot cleaner according to an embodiment.

As illustrated in FIG. 15, the robot cleaner 100 may include the controller 190, the ROM/RAM 193 and the storage 195.

The controller 190 may be configured to control a variety of operations related to the robot cleaner 100. The controller 190 may be implemented by using a central processing unit (CPU), and a micro controller unit.

The controller 190 may receive data, i.e., actual data, which is actually collected by the data collector 170, from the data collector 170, and determine a position and a direction of the robot cleaner 100 based on the actual data.

According to an embodiment, the controller 190 may input the actual data to the algorithm stored in the ROM/

RAM 193 and the storage 195, and acquire information related to the position corresponding to the actual data, e.g., coordinates, thereby determining an actual position of the robot cleaner 100 in the driving space.

According to an embodiment, the controller 190 may acquire a relationship between a direction angle based on the virtual data, and a distance between the robot cleaner 100 and a target, from the virtual data. The controller 190 may acquire a relationship between a direction angle based on the actual data, and a distance between the robot cleaner 100 and a target, from the actual data. Therefore, the controller 190 may acquire information related to an orientation to which the robot cleaner 100 actually faces, based on the difference between the relationship based on the virtual data and the relationship based on the actual data. A target may include a wall, furniture or a structure. The direction angle of the robot cleaner 100 may include an angle between a certain direction defined by the designer and a direction to which the front portion of the robot cleaner 100 faces.

The controller 190 may receive data related to the map from the ROM/RAM 193 and the storage 195, and acquire the virtual data from the data related to the map. The controller 190 may allow a certain algorithm 197 to perform the learning by substituting the virtual data, which is sequentially acquired, to the certain algorithm 197. The certain algorithm 197 may be the machine learning algorithm. The machine learning algorithm may include at least one of deep neural network (DNN), convolution neural network (CNN), recurrent neural network (RNN), deep belief neural network (DBN), and deep Q-networks.

The detail operation of the controller 190 has been described through the processor 10, as mentioned above. Hereinafter a detail description will be omitted.

The ROM/RAM 193 and the storage 195 may temporarily or non-temporarily store a variety of information related to the operation of the controller 190 and provide data which is requested by the controller 190, according to the control of the controller 190. Therefore, the ROM/RAM 193 and the storage 195 may assist the operation of the controller 190. The ROM/RAM 193 may include a semiconductor storage medium. The storage 195 may include a semiconductor storage medium, a magnetic disk storage medium or a magnetic drum storage medium.

According to an embodiment, the storage 195 may store the algorithm 197. The algorithm 197 may be an algorithm in which the learning is performed, and/or an algorithm in which the learning is not performed. The storage 195 may further store a map (not shown), which is needed to acquire the virtual data.

The controller 190, the ROM/RAM 193 and the storage 195 may be implemented by using a semiconductor chip and a related component installed on the substrate 135.

The robot cleaner 100 may further include the communicator 199. The communicator 199 may receive a variety of information related to the operation of the robot cleaner 100, from an external computing device (not shown) or other robot cleaner (not shown), or transmit information related to the operation of the robot cleaner 100, to the computing device or other robot cleaner. The computing device may include at least one of a desk top computer, a smart phone, a table PC, a lap top computer, and a server computer.

According to an embodiment, the robot cleaner 100 may receive information related to the map and the algorithm. The robot cleaner 100 may receive the learning algorithm 197. In addition, the robot cleaner 100 may transmit the directly acquired map or the learning algorithm 197 to the computing device or the robot cleaner.

The robot cleaner 100 may transmit the actual data to the computing device and other robot cleaner. In this case, the computing device and other robot cleaner may determine at least one of the actual position and the actual direction of the robot cleaner 100 by using the actual data. The robot cleaner 100 may receive at least one of the actual position and the actual direction of the robot cleaner 100, which is determined by the computing device and other robot cleaner, via the communicator 199. The controller 190 may determine the operation of the robot cleaner 100 based on at least one of the received actual position and actual direction of the robot cleaner 100.

According to an embodiment, the robot cleaner 100 may include a first driver 181, and a second driver 182.

The first driver 181 and the second driver 182 may generate a driving force for an operation of the first driving wheel 151 and the second driving wheel 152, and directly or indirectly transmit the generated driving force to the first driving wheel 151 and the second driving wheel 152. For this, the first driver 181 and the second driver 182 may be directly connected to the first driving wheel 151 and the second driving wheel 152, or the first driver 181 and the second driver 182 may be mechanically connected to the first driving wheel 151 and the second driving wheel 152 through a gear.

The first driver 181 and the second driver 182 may be implemented by using at least one of a motor or an actuator. Motor may include a DC motor, AC motor, a brushless DC motor (BLDC motor) or a linear induction motor, but is not limited thereto. The motor may be implemented by using a variety of types of driving devices considered by the designer.

As needed, the robot cleaner 100 may further include a first drive detector 183 and a second drive detector 184. The first drive detector 183 and the second drive detector 184 may be implanted by using a rotary encoder or a potentiometer.

The first drive detector 183 and the second drive detector 184 may detect the operation of the first driving wheel 151 and the second driving wheel 152, respectively, and then transmit the detection result to the controller 190. The controller 190 may control the first driver 181 and the second driver 182 based on the received detection result. For example, when an electrical signal corresponding to a rotation angle of the first driving wheel 151 and the second driving wheel 152, is output from the first drive detector 183 and the second drive detector 184, the controller 190 may receive the electrical signal output from the first drive detector 183 and the second drive detector 184 and determine the rotation angle of the first driving wheel 151 and the second driving wheel 152. When the determined rotation angle corresponds to a predetermined rotation angle, the controller 190 may transmit a control signal to the first driver 181 and the second driver 182 so that the first driving wheel 151 and the second driving wheel 152 stop their rotation.

The input 121 may receive a variety of commands from a user, and the display 122 may visually provide a variety of information to a user.

The input 121 may receive at least one of a map related to a driving area in which the robot cleaner 100 is to drive, and the algorithm, which is used for the learning. The input 121 may be implemented by using a variety of input terminals, e.g., a physical button, a touch button, a touch screen, a joy stick, a track ball, or a universal serial bus (USB).

The display 122 may display information related to the map used for the acquisition of the virtual data and a variety of information related to the operation of the robot cleaner 100, e.g., whether to learn, or whether the learning is completed. The display 122 may be implemented by using a certain display panel, e.g., liquid crystal display (LCD). In addition, the display 122 may be implemented by using an illumination device, e.g., light emitting diode (LED). When the input 121 employs a touch screen, a separate display 122 may be omitted.

The power source 123, the suction motor 134 and the data collector 170 have been described, and thus a detail description thereof will be omitted.

Hereinafter an example of process of determining a position of the robot cleaner will be described.

Figure 16:
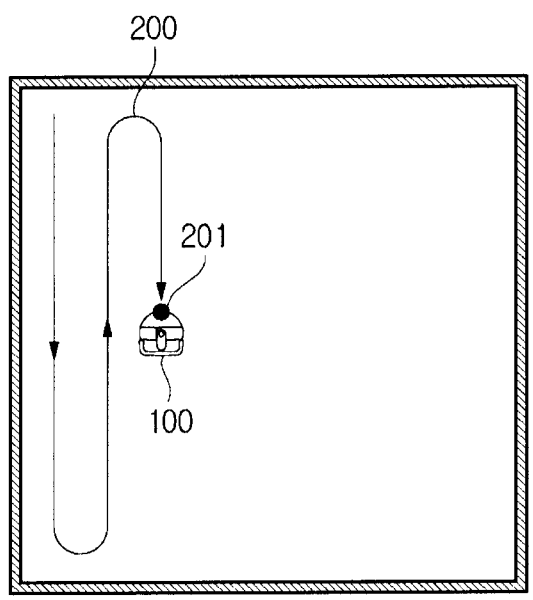
FIG. 16 is a view illustrating a driving path of the robot cleaner.
Figure 17:
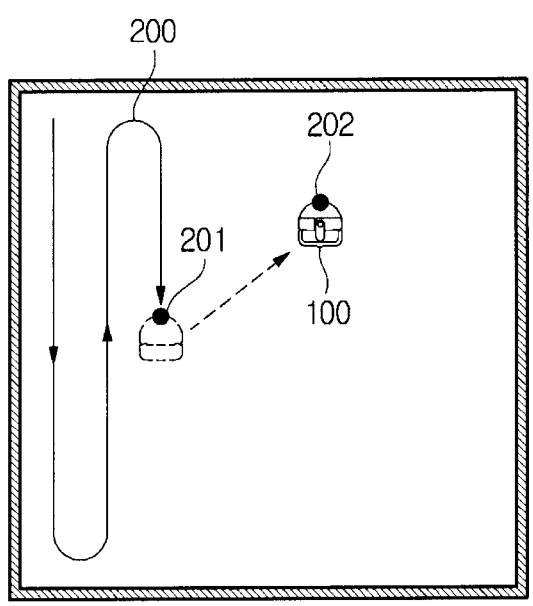
FIG. 17 is a view illustrating an example in which the position of the robot cleaner is arbitrarily changed.
Figure 18:
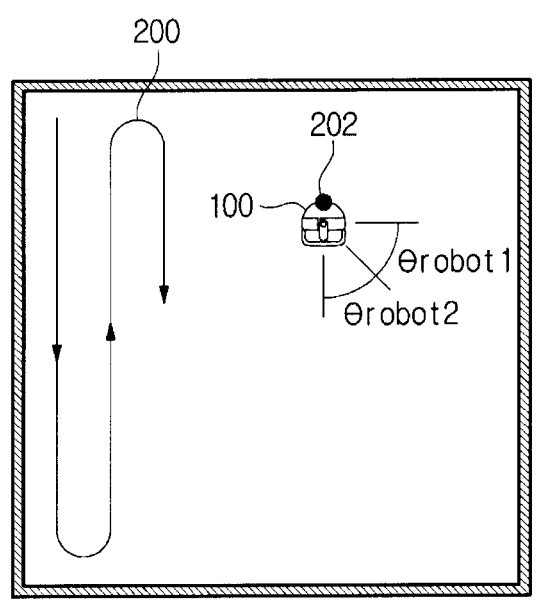
FIG. 18 is a view illustrating a process in which the robot cleaner acquires the actual data.
Figure 19:
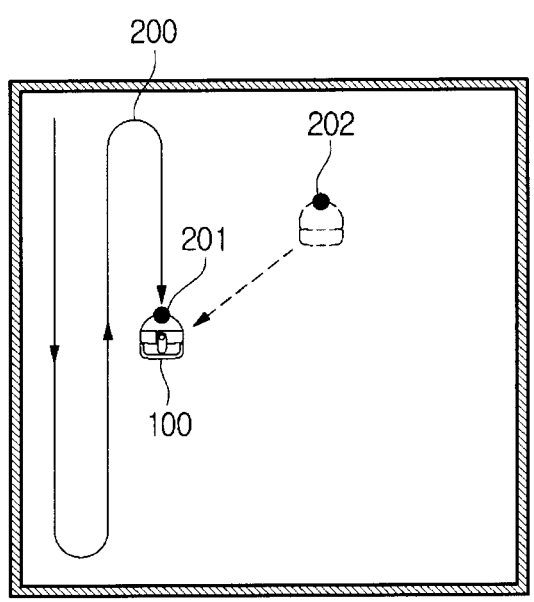
FIG. 19 is a view illustrating an example of an operation of the robot cleaner after acquiring the actual data.

FIG. 16 is a view illustrating a driving path of the robot cleaner, and FIG. 17 is a view illustrating an example in which the position of the robot cleaner is arbitrarily changed. FIG. 18 is a view illustrating a process in which the robot cleaner acquires the actual data, and FIG. 19 is a view illustrating an example of an operation of the robot cleaner after acquiring the actual data.

As illustrated in FIG. 16, the robot cleaner 100 may drive in a cleaning space according to a predetermined driving pattern. The predetermined driving pattern may be defined or determined by the user, the designer or the controller 190. According to the predetermined driving pattern, the robot cleaner 100 may drive in a meander-line pattern, a zig-zag pattern, a spiral pattern, a circular or rectangular pattern, or a combination thereof.

In addition, the robot cleaner 100 may drive in various patterns according to the determination of the user, the designer or the controller 190.

As illustrated in FIG. 17, the position of the robot cleaner 100 may be arbitrarily changed by the interference. For example, a user may move the robot cleaner 100 from one position 201 in a driving pattern 200, to one position 202 except for the driving pattern.

In response to the movement to the new position 202, the robot cleaner 100 may start an operation to determine the new position 202. Particularly, the controller 190 of the robot cleaner 100 may transmit a control signal to the data collector 170 to allow the data collector 170 to be started so as to determine a current position of the robot cleaner 100. Therefore, the data collector 170 may collect information related to the vicinity of the robot cleaner 100, e.g., an image or a detection result.

In this case, the controller 190 may transmit the control signal to the first driver 181 and the second driver 182 so that the robot cleaner 100 is rotated in a certain direction (a1) in the new position 202, as illustrated in FIG. 18.

According to an embodiment, according to the control of the controller 190, the robot cleaner 100 may be rotated by a certain angle (θrobot1) and then stopped. Particularly, when the robot cleaner 100 is rotated by the certain angle (θrobot1), the controller 190 may transmit a control signal to the first driver 181 and the second driver 182 so as to stop the first driver 181 and the second driver 182. Accordingly, the operation of the driving wheels 151 and 152 may be stopped and thus the robot cleaner 100 may be rotated by the certain angle (θrobot1) and then stopped. Whether the robot cleaner 100 is rotated by the certain angle (θrobot1) or not, may be determined based on the output signal of the first drive detector 183 and the second drive detector 184.

In response to the stop of the rotation of the robot cleaner 100, the data collector 170 may collect actual data related to the front side of the robot cleaner 100 through the reception of the visual light or the transmission and reception of the infrared light about the front side.

When the data collection of the data collector 170 is completed, the robot cleaner 100 may be rotated by a certain angle (θrobot2), again and then stopped. When the robot cleaner 100 is stopped, the data collector 170 may collect data, again. The above mentioned process may be repeated by a number of times according to the determination of the user, the designer or the controller 190. As needed, the robot cleaner 100 may be rotated by approximately 360 degrees or 360−θrobot1 degrees, and the data collector 170 may repeatedly collect data by 360/θrobot1 times. In this case, the data collector 170 may collect data related to all directions in the vicinity of the robot cleaner 100.

When the data collector 170 is an omnidirectional camera, the robot cleaner 100 may not need to rotate at a position, which is newly changed, to acquire the actual data about all directions. In this case, while the robot cleaner 100 maintains in the stopped state in the position 202, the data collector 170 may collect the actual data by imaging about all directions.

The controller 190 may apply the acquired actual data to a pre-learned algorithm 197, and acquire information, e.g., coordinates, related to the position 202 of the robot cleaner 100 corresponding to the actual data, from the learning algorithm 197. The learning algorithm 197 may be acquired prior to the driving of the robot cleaner 100. Alternatively, the learning algorithm 197 may be acquired by at least one of the robot cleaner 100, the computing device and other robot cleaner, according to embodiments. Accordingly, the controller 190 may determine the current position 202 of the robot cleaner 100.

According to the above mentioned method, when the robot cleaner 100 determines the new position 202, it may be not required that the robot cleaner 100 is moved to an additional position. In other words, according to the conventional manner, e.g., local re-localization and global re-localization, it may be required that the robot cleaner 100 is moved to estimate a position to which the robot cleaner 100 is moved, but according to the above mentioned method, the movement of the robot cleaner 100 may be not required. Therefore, since it is possible to omit the unnecessary movement of the robot cleaner 100, the robot cleaner 100 may more quickly recognize the position 202 to which the robot cleaner 100 is moved. The robot cleaner 100 may determine a next operation based on the recognized moved position 202, and thus it may be possible to improve the efficiency of the operation.

When the current position 202 of the robot cleaner 100 is determined, the controller 190 may control the robot cleaner 100 according to at least one of the user selection, a predetermined setting and a random determination of the controller 190.

For example, the controller 190 may control the robot cleaner 100 so that the robot cleaner 100 returns to the position 201, which is an original position before moving. In addition, for another example, the controller 190 may control each component of the robot cleaner 100 so that the robot cleaner 100 further performs a remaining operation of the driving pattern in the moved position 202. For another example, the controller 190 may set a route to an initial destination, which is intended by the robot cleaner 100, from the current position 202, and control the robot cleaner 100 so that the robot cleaner 100 moves to the initial destination according to the set route. In addition, the controller 190 may determine a new driving pattern started from the newly determined current position 202 and generate a control signal for each component of the robot cleaner 100 according to the newly determined driving pattern.

Hereinbefore, the robot cleaner 100 has been described as an example of the movable object 1. However, the movable object 1 may be not applied to only the robot cleaner 100. The movable object 1 may be applied to a variety of movable apparatus, e.g., vehicles, carts, a variety of construction equipment, robot vacuum cleaner, toy cars, medical equipment, robots used in the industrial, medical or military purposes, in the same manner or in a partially modified manner.

Hereinafter a method for controlling the movable object according to an embodiment will be described with reference to FIGS. 20 and 21.

Figure 20:
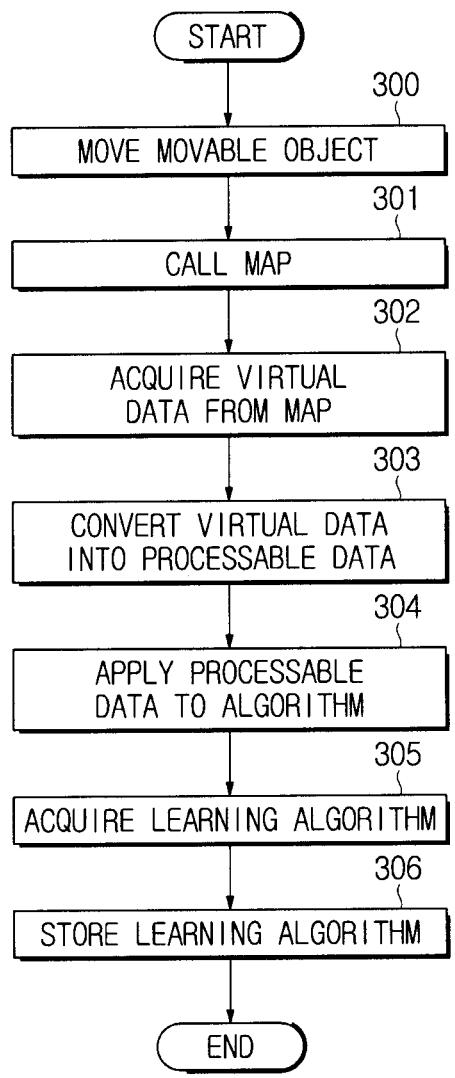
FIG. 20 is a first flowchart illustrating a method for controlling the movable object according to an embodiment.

FIG. 20 is a first flowchart illustrating a method for controlling the movable object according to an embodiment. When the movable object starts to move (300), the movable object 1 may call the map (301).

Sequentially, the movable object may acquire the virtual data from the called map (302). For example, the movable object may acquire the virtual data through the ray casting method. In this case, the movable object may perform the ray casting about the plurality of directions and thus the movable object may acquire the virtual data related to a number of points in the map.

When the virtual data is acquired, the movable object may convert the virtual data to the processable data (302). The processable data may include a binary image. For example, the movable object may acquire the processable data by converting an image about each image acquired by the ray casting, into a binary image.

The movable object may apply the processable data to the algorithm (304). The algorithm may include a separate algorithm for the machine learning, e.g., deep neural network, convolution neural network, recurrent neural network, deep belief neural network, and deep Q-neural network.

Therefore, the movable object may acquire the algorithm which performs the learning based on the virtual data (305).

The learning algorithm may be stored in the storage in the movable object (306).

The above mentioned calling map step and acquiring learning algorithm step (301 to 305) may be directly performed by the movable object or a device other than the movable object, e.g., a computing device or other movable object.

Some steps among the above mentioned calling map step and acquiring learning algorithm step (301 to 305) may be performed by the movable object or other step may be performed by a computing device or other movable object.

In addition, the plurality of movable objects may perform the above mentioned calling map step and acquiring learning algorithm step (301 to 305) by having the communication with each other. For example, the plurality of movable objects may perform the above mentioned steps (301 to 305) on a certain area assigned to each movable object. Particularly, any one movable object may perform the above mentioned steps (301 to 305) on a part area on the entire map, by acquiring the learning algorithm and another movable object may perform the above mentioned steps (301 to 305) on other part area, by acquiring the learning algorithm.

When the learning algorithm is acquired, as mentioned above, the movable object may use the learning algorithm to determine an actual position of the movable object.

Figure 21:
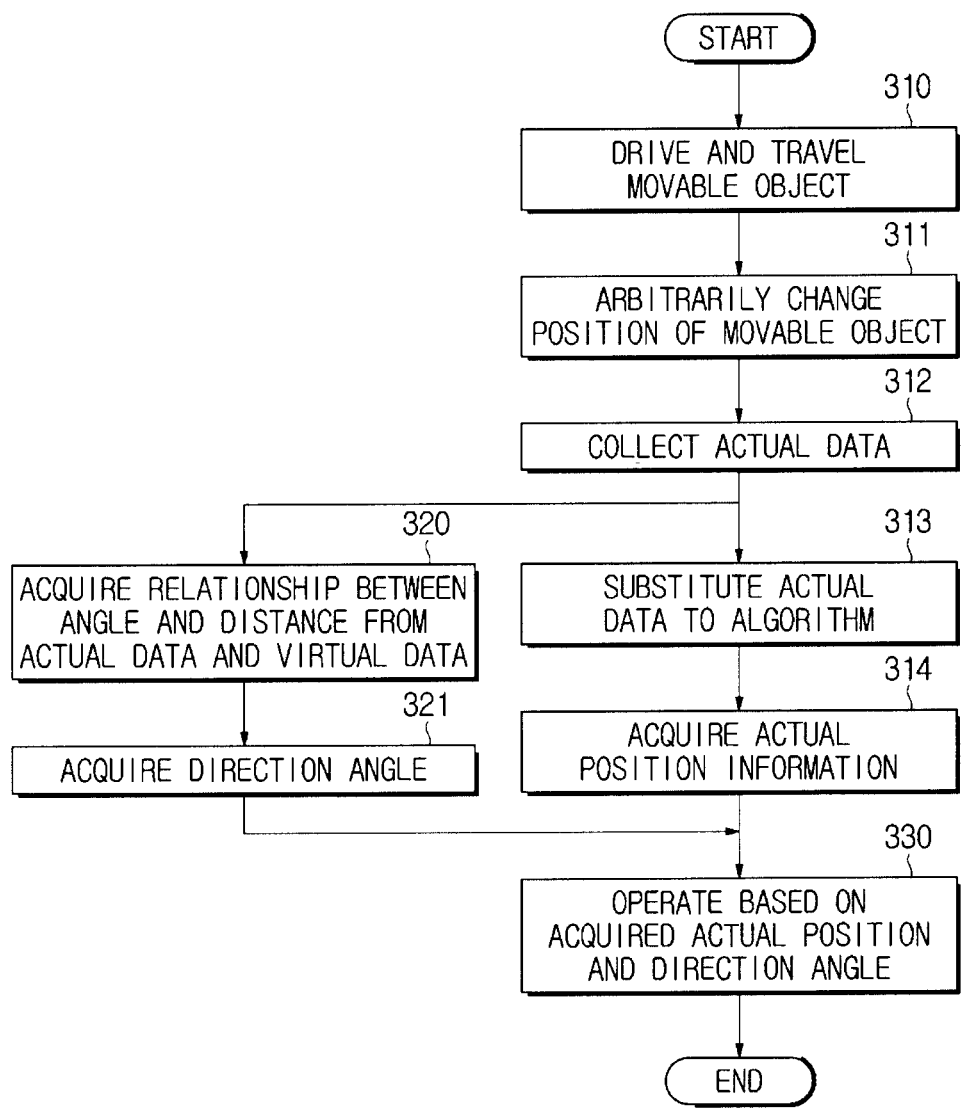
FIG. 21 is a second flowchart illustrating a method for controlling the movable object according to an embodiment.

FIG. 21 is a second flowchart illustrating a method for controlling the movable object according to an embodiment. In this method, firstly, the movable object may perform the operation and the driving (310).

The position of the movable object may be moved to an arbitrary position during the movable object drives (311). For example, the movable object may be moved from an expected position to other position, by the user.

When the movable object is moved to other position, the movable object may collect the actual data in the moved position (312). The collection of the actual data may be performed by using a visible light camera, an infrared camera, an obstacle detection sensor or a distance sensor. The visible light camera or the infrared camera may be implemented by employing a camera having a certain angle of view. The visible light camera or the infrared camera may be an omnidirectional camera.

When the actual data is collected (312), the movable object may acquire information related to the actual position, and information related to a direction angle of the movable object, that is information about a direction to which the movable object faces, through an additional process (313, 314, 320, and 321).

According to an embodiment, the movable object may substitute the acquired actual data into the learning algorithm acquired at the step 305 of FIG. 20 (313).

By using the learning algorithm, the position information corresponding to the actual data may be acquired, and thus the movable object may determine an actual position of the movable object (314).

The movable object may acquire the relationship between an angle and a distance to a target, from the actual data and the virtual data (320).

The virtual data may be acquired from the map. As needed, the movable object may acquire the relationship between an angle and a distance to a target, by using the virtual data acquired at the step 302 of FIG. 20. The movable object may additionally acquire the virtual data from the map through the ray casting method, and acquire the relationship between the angle and the distance to the target based on the virtual data.

Sequentially, the movable object may acquire a direction angle of the movable object based on the relationship between an angle and a distance to a target acquired from the actual data and the relationship between an angle and a distance to a target acquired from the virtual data (321).

When the relationship between an angle and a distance to a target acquired from the actual data is identical to the relationship between an angle and a distance to a target acquired from the virtual data, the movable object may determine that the direction angle of the movable object is identical to the direction angle at the acquisition of the virtual data, as predetermined. For example, when the direction angle at the acquisition of the virtual data is defined as 0 (zero) degree, the rotation angle of the movable object may be determined to be 0 (zero) degree.

When the relationship between an angle and a distance to a target acquired from the actual data is not identical to the relationship between an angle and a distance to a target acquired from the virtual data, the movable object may shift at least one of the relationship between an angle and a distance to a target acquired from the actual data, and the relationship between an angle and a distance to a target acquired from the virtual data. During shifting, when the relationship between an angle and a distance to a target acquired from the actual data is identical to the relationship between an angle and a distance to a target acquired from the virtual data, the movable object may determine a shift degree of at least one of the relationship between an angle and a distance to a target acquired from the actual data and the relationship between an angle and a distance to a target acquired from the virtual data. The movable object may determine an angle corresponding to the shift degree so as to determine the direction angle of the movable object.

The determination of the actual position of the movable object (313 and 314) and the acquisition of the direction angle of the movable object (320 and 321) may be performed, simultaneously or sequentially. When performing sequentially, the determination of the actual position of the movable object (313 and 314) may be performed prior to the acquisition of the direction angle of the movable object (320 and 321), or the acquisition of the direction angle of the movable object (320 and 321) may be performed prior to the determination of the actual position of the movable object (313 and 314).

When the actual position and the direction angle of the movable object is acquired and determined (314 and 321), the movable object may perform the operation according to the acquired and determined actual position and the direction angle of the movable object (330).

For example, the movable object may return to the position before the arbitrary change. In this case, the controller may generate a control signal based on the actual position and the direction angle of the movable object and the position before the arbitrary change, and transmit the generated control signal to each component of the movable object. Accordingly, the movable object may move from the position after the change, to the position before the change. For another example, the movable object may determine the actual position and the direction angle of the movable object, as a start point of the new driving pattern, and start the driving from the actual position and the direction angle of the movable object. For another example, the movable object may reset a route from the actual position of the movable object to an initial destination and start the driving along the reset route.

The method for controlling the movable object illustrated with reference to FIGS. 20 and 21 may be applied to a method for controlling the robot cleaner in the same form or in a partially modified form. In addition, the above mentioned method for controlling movable object may be applied to a method for controlling a vehicle, a cart, various construction equipment, a toy car, a medical apparatus, and industrial, medical or military robots in the same form or in a partially modified form.

Methods for controlling the movable object according the above-described embodiments may be implemented using a program executed by a variety of computer means. The program may include program instructions, data files, and data structures as itself or a combination therewith. The program may be designed or manufactured by using higher level code executed by the computer by using an interpreter, as well as by using a machine code that is produced by a compiler. In addition, the program may be particularly designed to implement the control method of the above mentioned movable object or may be implemented by using various functions or definitions that are well-known and available to a person of ordinary skill in the computer software field.

Programs for implementing the method for controlling the movable object may be recorded on a non-transitory recording medium readable by a computer. The recording medium readable by a computer may include various types of hardware devices capable of storing a particular program executed in response to a call from a computer, e.g. magnetic disk storage media such as a hard disk or a floppy disk, optical media such as a magnetic tape, a compact disc (CD) or a DVD, magneto-optical media such as a floptical disk, and semiconductor memory devices such as ROM, RAM, or flash memory.

It is noted that elements described above such as any of the communicator 33, data collector 31, processor 10, storage 20 or driver 35 may be, or form part of, an integrated circuit. Any of these elements such as the communicator 33 may alternatively termed a communicator circuit, circuitry, or the like.

Hereinbefore a variety of embodiments of the movable object and the control method of the movable object are described, but the technology is not limited thereto. A variety of embodiments may be implementable by those skilled in the art by modification based on the above mentioned embodiments may correspond to the above mentioned movable object and the control method of the movable object. For example, when the above-mentioned techniques are executed in a different order from the above-mentioned method, and/or the above-mentioned components such as system, structure, device and circuit are coupled or combined in a manner different from the above-mentioned method or replaced or substituted by other components or equivalents, the same or the similar result as the above-mentioned movable object and control method of the movable object may be achieved and those may correspond to an example of the above-mentioned movable object and control method of the movable object.

As is apparent from the above description, it may be possible to more quickly and accurately estimate and determine the position in which the movable object is currently placed, as compared to prior art techniques.

Moreover, if the movable object is moved to an arbitrary position by the user or is moved outside while the movable object performs the autonomous navigation, the movable object may quickly and accurately determine a position to which the movable object is moved. Thus, the movable object may more suitably determine an operation, which is to be performed by the movable object from the newly determined position.

Further, when the movable object is disposed at an arbitrary position, the movable object may quickly and accurately determine its current position without an additional operation such as moving to another position.

Although a few embodiments of the present disclosure have been shown and described, it would be appreciated by those skilled in the art that changes may be made in these embodiments without departing from the principles and spirit of the disclosure, the scope of which is defined in the appended claims and their equivalents.

What is claimed is:

1. A method for controlling a movable object comprising:
   executing, by a processor, operations comprising:
   acquiring virtual data by measuring distances between each of a plurality of known positions within an area and surfaces in the area, in a plurality of directions, respectively, based on a map of the area;
   acquiring virtual binary data from the virtual data;
   determining a function, such that when the function receives inputs corresponding to the virtual binary data, the function outputs the plurality of known positions;
   acquiring actual distance data and actual angle data between the movable object and a plurality of surfaces in the vicinity of the movable object;
   estimating an actual position of the movable object corresponding to the actual distance data by inputting the actual distance data and the actual angle data to the function; and controlling the movable object based on the estimated actual position.

2. The method of claim 1, wherein the acquisition of the virtual data for at least one known position of the plurality of known positions comprises performing a ray casting in a horizontal plane about 360 degrees of the at least one known position on the map.

3. The method of claim 1, wherein the function is a machine learning algorithm that outputs the plurality of known positions when inputs corresponding to the virtual data are applied as inputs.

4. The method of claim 3, wherein the function comprises at least one of deep neural network (DNN), convolution neural network (CNN), recurrent neural network (RNN), deep belief neural network (DBN), and deep Q-networks.

5. The method of claim 3, wherein determining the function comprises converting the virtual data into processable data and performing machine learning such that at least one known position of the plurality of known positions is output when the processable data is input.

6. The method of claim 1, further comprising:
stopping movement of the movable object, prior to the acquisition of the virtual data.

7. The method of claim 6, wherein the acquisition of the actual distance data comprises rotating an electromagnetic or optical sensor of the movable object to at least one direction by a predetermined angle, and acquiring the actual distance data using the electromagnetic or optical sensor.

8. The method of claim 1, further comprising:
acquiring an actual relative position in which a target is present with respect to the movable object, based on the actual distance data.

9. The method of claim 8, wherein the relative position comprises a distance between the movable object and the target, an angle between a direction in which the target is present with respect to the movable object, and a reference direction.

10. The method of claim 8, further comprising:
acquiring virtual data at the actual position of the movable object on the map when the actual position of the movable object is estimated;
acquiring a virtual relative position in which the target is present with respect to the movable object, based on the virtual data at the actual position of the movable object; and
determining a direction or the angle data of the movable object based on the actual relative position and the virtual relative position.

11. A non-transitory computer-readable storage medium having stored therein program instructions which, when executed by a processor of a movable object cause the processor to perform a method comprising:
acquiring virtual data representing distances between each of a plurality of known positions within an area and surfaces in the area, in a plurality of directions, respectively, based on a map of the area;
generating binary data from the virtual data;
training a neural network to outputs the plurality of known positions when the binary data is input;
acquiring actual distance data and actual angle data between the movable object and a plurality of surfaces in the vicinity of the movable object;
estimating an actual position of the movable object corresponding to the actual distance data by inputting the actual distance data and the actual angle data to the neural network; and
controlling the movable object based on the estimated actual position.

12. A movable object comprising:
a storage storing a map of an area;
a data collector acquiring actual distance data between the movable object and a plurality of surfaces in the vicinity thereof, in a plurality of directions, respectively;
a processor executing instructions for:
acquiring virtual data by measuring distances between each of a plurality of known positions within the area and surfaces in the area, in the plurality of directions, respectively, based on the map;
acquiring virtual binary data from the virtual data;
determining a function, such that when the function receives inputs corresponding to the virtual data, the function outputs the plurality of known positions;
acquiring the actual distance data and actual angle data from the data collector; and
estimating an actual position of the movable object corresponding to the actual distance data by inputting the actual distance data and the actual angle data to the function.

13. The movable object of claim 12, wherein the processor acquires the virtual data by performing a ray casting in a horizontal plane about 360 degrees of at least one known position on the map.

14. The movable object of claim 12, wherein the function comprises a machine learning algorithm that learns positions corresponding to the virtual data applied as input data.

15. The movable object of claim 14, wherein the processor determining the function comprises converting the virtual data into processable data, and performing machine learning such that at least one known position of the plurality of known positions is output when the processable data is input.

16. The movable object of claim 12, further comprising:
at least one driving wheel rotating in at least one direction, wherein the processor stops the rotation of the driving wheel prior to the acquisition of the actual distance data.

17. The movable object of claim 16, wherein the data collector acquires the actual data over 360 degrees in a horizontal plane.

18. The movable object of claim 12, wherein the processor acquires an actual relative position in which a target is present with respect to the movable object, based on the actual distance data.

19. The movable object of claim 18, wherein the relative position comprises a distance between the movable object and the target, an angle between a direction in which the target is placed with respect to the movable object, and a reference direction.

20. The movable object of claim 18, wherein the processor acquires virtual data at an actual position of the movable object on the map when the actual position of the movable object is estimated; acquires a virtual relative position in which the target is present with respect to the movable object based on the virtual data at the actual position of the movable object; and determines a direction of the movable object based on the actual relative position and the virtual relative position.

* * * * *